INVENTOR.
Homer E. Benson

Feb. 16, 1971  H. E. BENSON  3,563,695
SEPARATION OF $CO_2$ AND $H_2S$ FROM GAS MIXTURES
Filed March 4, 1969  10 Sheets-Sheet 6

INVENTOR.
Homer E. Benson
BY
*William M Ayres*
ATTORNEY.

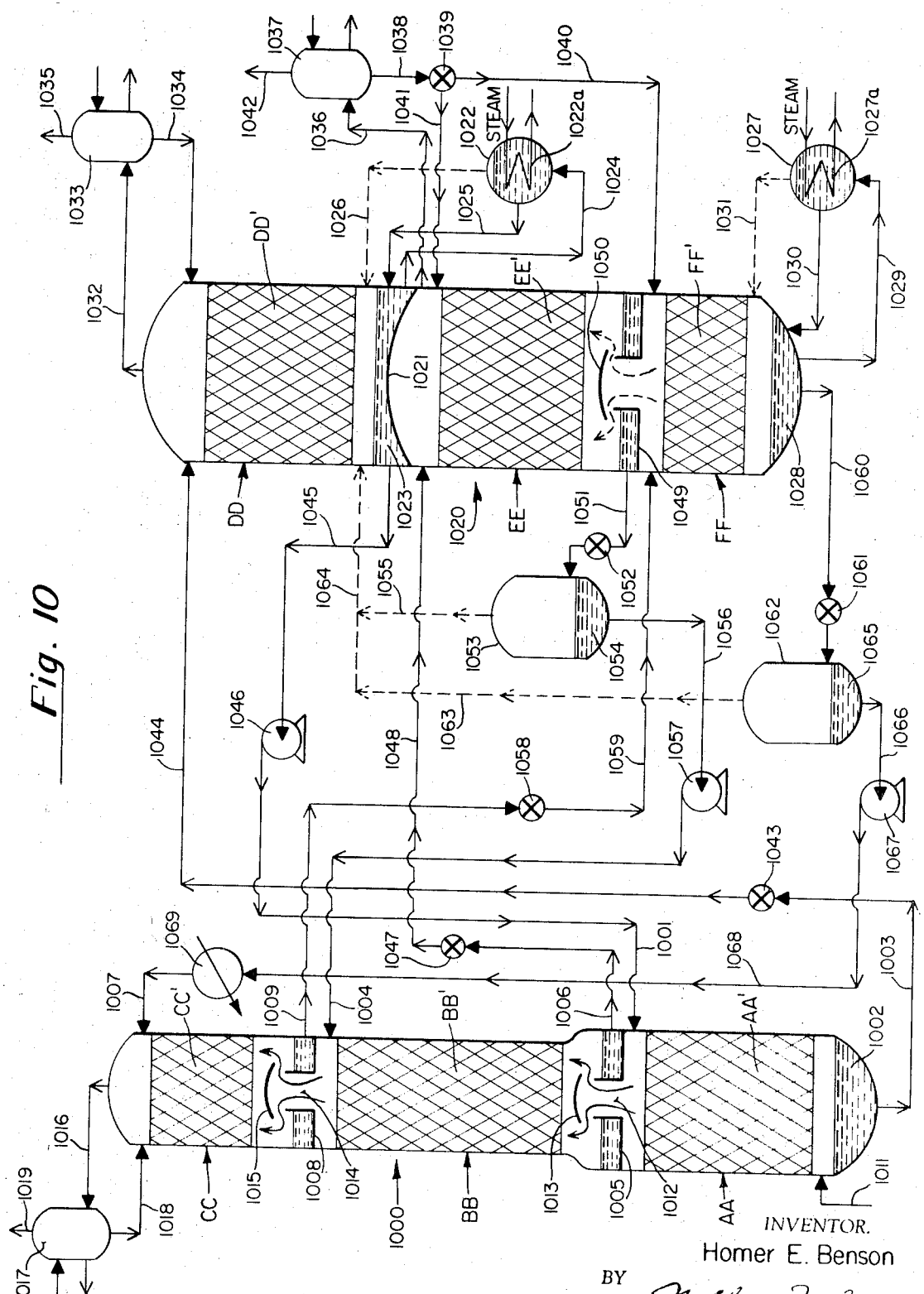

United States Patent Office 3,563,695
Patented Feb. 16, 1971

3,563,695
SEPARATION OF CO$_2$ AND H$_2$S
FROM GAS MIXTURES
Homer E. Benson, Pittsburgh, Pa., assignor to
Benson, Field and Epes, a copartnership
Continuation-in-part of application Ser. No. 715,412,
Mar. 22, 1968. This application Mar. 4, 1969, Ser.
No. 804,247
Int. Cl. B01d 47/00
U.S. Cl. 23—2
30 Claims

ABSTRACT OF THE DISCLOSURE

A process of improved thermal efficiency and lower capital cost for separating the acid gases CO$_2$ and/or H$_2$S from gas mixtures which is applicable when the partial pressure of acid gas is at least 25 pounds per square inch. Two separate absorption zones are used, supplied with separate streams of solution and operating at different temperatures. The gas flows in series through the separate absorption zones with solution leaving the higher temperature zone at a temperature higher than the atmospheric boiling temperature of the regenerated solution. Two separate regeneration zones are used operating at different temperatures (and correspondingly different pressures) with solution from the higher temperature absorption zone regenerated in the higher temperature, higher pressure regeneration zone. Stripping steam for the lower temperature regeneration zone is generated by reducing the pressure on the hot regenerated solution from the higher temperature regeneration zone. The process permits the effective utilization of the heat content of hot feed gases and the heat of absorption of the acid gases, which heat sources have been in previous practice largely wasted.

This application is a continuation-in-part of copending application Ser. No. 715,412 filed Mar. 22, 1968, by Homer E. Benson for Separation of CO$_2$ and H$_2$S from Gas Mixtures, and now abandoned.

This invention relates to the separation of CO$_2$ and H$_2$S from gas mixtures.

A number of highly important industrial processes require the removal of large quantities of CO$_2$ and H$_2$S from gas mixtures containing these slightly acidic gases. Most industrial hydrogen used in the production of synthetic ammonia or in hydrogenation processes, and most hydrogen-carbon monoxide mixtures used as towns gas, or for the oxo-synthesis process, or for methanol synthesis, or the like, are produced by steam-reforming of natural gas or naphtha, or by the partial oxidation of natural gas, naphtha, hydrocarbon oils, or solid fuels such as coal. These reforming, or partial oxidation, processes produce raw gas mixtures containing from about 15% to 35% CO$_2$. All or most of the CO$_2$ must be removed before the hydrogen or the H$_2$-CO mixtures can be used for their intended purposes. The capital cost of the CO$_2$ separation plant and the cost of its operation are both significant factors in the overall economics of producing hydrogen and H$_2$-CO mixtures by these processes.

Of rapidly increasing importance also is the processing of natural gas deposits which may contain high percentages of CO$_2$ and H$_2$S which must be removed before the gas is fit for use. Here again, the capital cost of the plant for separating these constituents and the cost of its operation is a significant factor in determining the cost of the purified natural gas product.

The most widely accepted industrial processes for the separation of CO$_2$ and H$_2$S involve the use of regenerable aqueous alkaline scrubbing solutions such as aqueous ethanolamine or potassium carbonate solutions which are continuously circulated between an absorption zone where acid gases are absorbed and a regeneration zone where they are desorbed, usually by steam-stripping. In such scrubbing processes, the capital cost of the scrubbing plant is controlled, of course, by the size of the equipment required, particularly the size of the absorption and regeneration towers (which, of course, is determined by the quantity of packing or the number of contacting trays required to carry out the absorption and desorption operations), the size of the reboilers for generating stripping steam, and the size of the condensers which condense spent stripping steam so that condensate may be returned to the system to maintain proper water balance. The cost of operating such scrubbing plants is related principally to their thermal efficiency; that is, the amount of heat required for the removal of a given amount of acid gas, sometimes expressed, for example, as cubic feet of acid gas removed per pound of steam consumed.

In accordance with the present invention, a new process has been discovered utilizing regenerable aqueous alkaline scrubbing solutions which not only provides markedly increased thermal efficiency, but also makes possible substantial reductions in the capital cost of the scrubbing plant. As will be apparent from the detailed description which follows, the new process makes possible the effective utilization of heat sources that in prior processes are largely or completed wasted, including particularly the heat of absorption of the acid gases in the scrubbing solution and the heat introduced into the system by the gas mixture being treated.

According to the new process, which is applicable generally to gas mixtures in which the partial pressure of acid gas (CO$_2$+H$_2$S) is at least about 25 pounds per square inch, there is established at least two separate superatmospheric pressure absorption zones supplied with separate streams of a regenerable aqueous alkaline scrubbing solution which are separately withdrawn from each absorption zone. At least two separate regeneration zones are established wherein the separate streams of solution from the absorption zones are steam-stripped to desorb the acid gas, the regeneration zones operating at pressures substantially lower than the pressure in the absorption zones. The gas mixture from which acid gas is to be separated is passed in series through the separate absorption zones in successive contact with the separate streams of scrubbing solution to absorb the acid gas in these streams. One of the absorption zones is maintained as a higher temperature zone with a solution outlet temperature which is above the atmospheric boiling temperature of the regenerated solution. Another of the absorption zones is maintained as a lower temperature zone with a solution outlet temperature lower than that of the higher temperature absorption zone. One of the regeneration zones is maintained as a higher temperature zone operating at superatmospheric pressure (and thus at temperatures above the atmospheric boiling temperature of the regenerated solution) and supplied with hot solution from the higher temperature absorption zone. Another of the regeneration zones is maintained as a lower pressure, lower temperature zone supplied with solution from the lower temperature absorption zone. The regenerated solution leaving the higher pressure regeneration zone, at a temperature above its atmospheric boiling temperature, is conducted to a flashing tank or equivalent pressure reduction zone where pressure is released on the solution, resulting in the flashing off of steam and the cooling of the solution. The flashed steam released in this manner is introduced into the lower pressure regeneration zone as stripping steam while the cooled, regenerated solution from the flashing zone, and the regenerated solution from the lower temperature regeneration zone are returned to the absorption zones.

As will be explained more in detail below, the order in which the higher temperature and lower temperature absorption zones are arranged with respect to the flow of the gas will depend upon the initial condition of the gas. For example, if the gas is initially hot relative to the scrubbing solution and saturated with water vapor and thus transfers its heat to the solution, the gas will contact the higher temperature absorption zone first and the lower temperature zone second. If the gas, on the other hand, is cool relative to the solution and thus takes heat away from the solution, it will contact the lower temperature absorption zone first and the higher temperature zone second.

For a more detailed explanation of the invention, reference is made now to the accompanying drawings wherein FIG. 1 is a diagrammatic flow sheet illustrating one embodiment of the invention adapted for the treatment of hot feed gases and employing two separate absorption zones and two separate regeneration zones.

Figure 4:
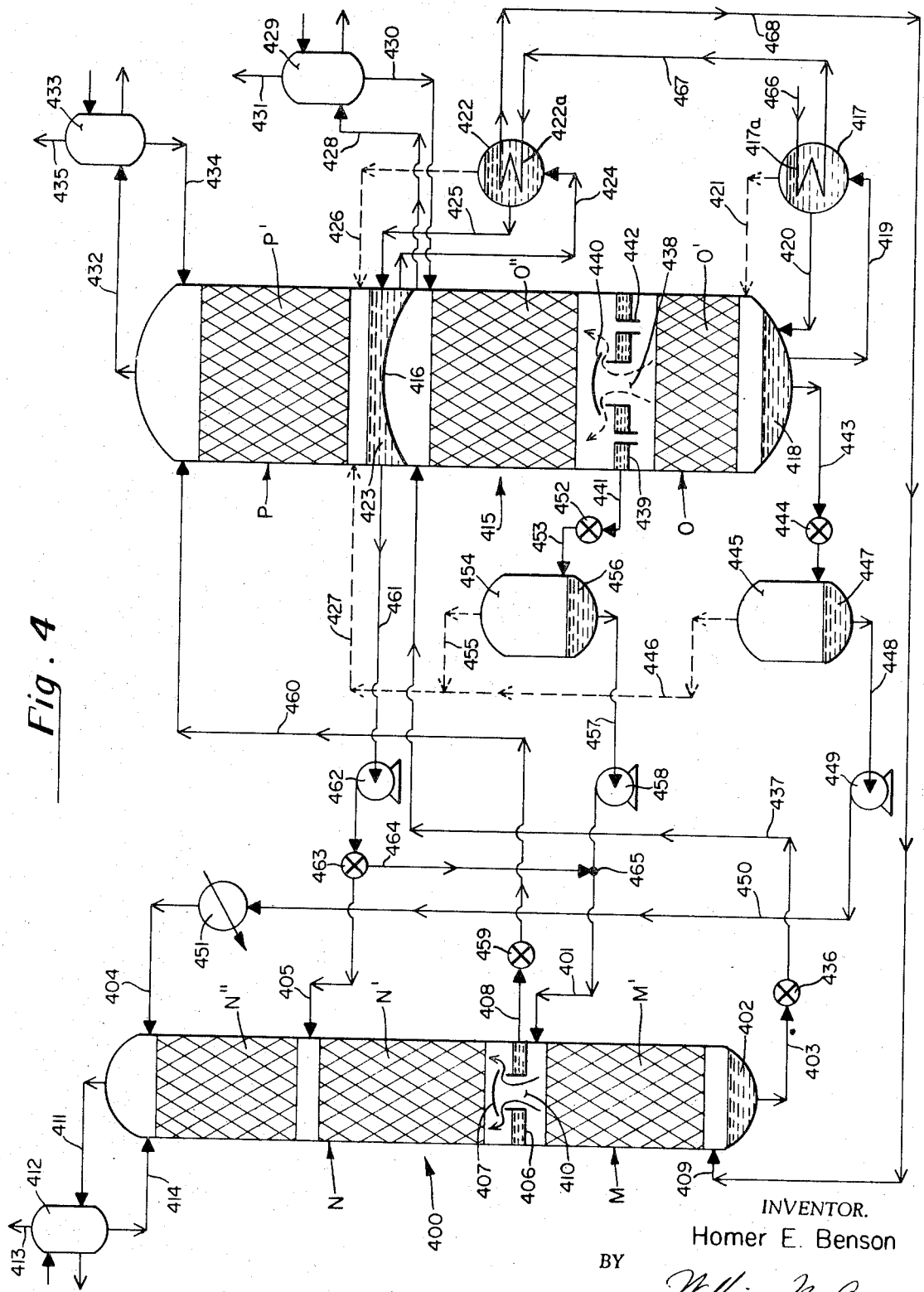

FIG. 4 is a diagrammatic flow sheet illustrating a preferred embodiment of the invention adapted for the treatment of hot feed gases and employing two separate absorption zones and two separate regeneration zones in which the upper section of the lower temperature absorption zone is supplied with cooled, more thoroughly regenerated solution from the lower section of the higher pressure, higher temperature regeneration zone.

Figure 4A:
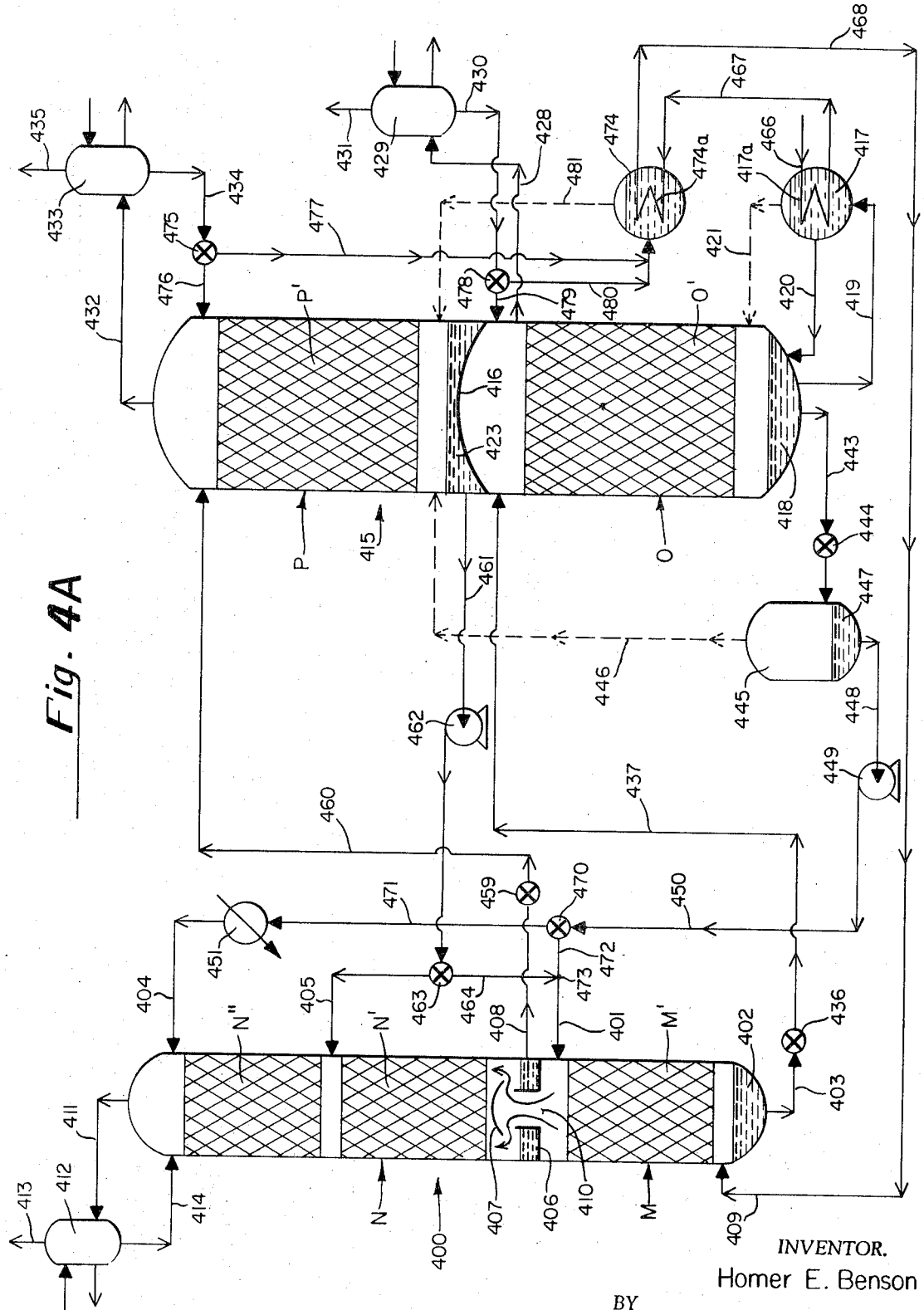

FIG. 4a is a diagrammatic flow sheet illustrating a particularly preferred embodiment of the invention similar to the embodiment shown in FIG. 4 but providing lower plant cost.

Figure 5:
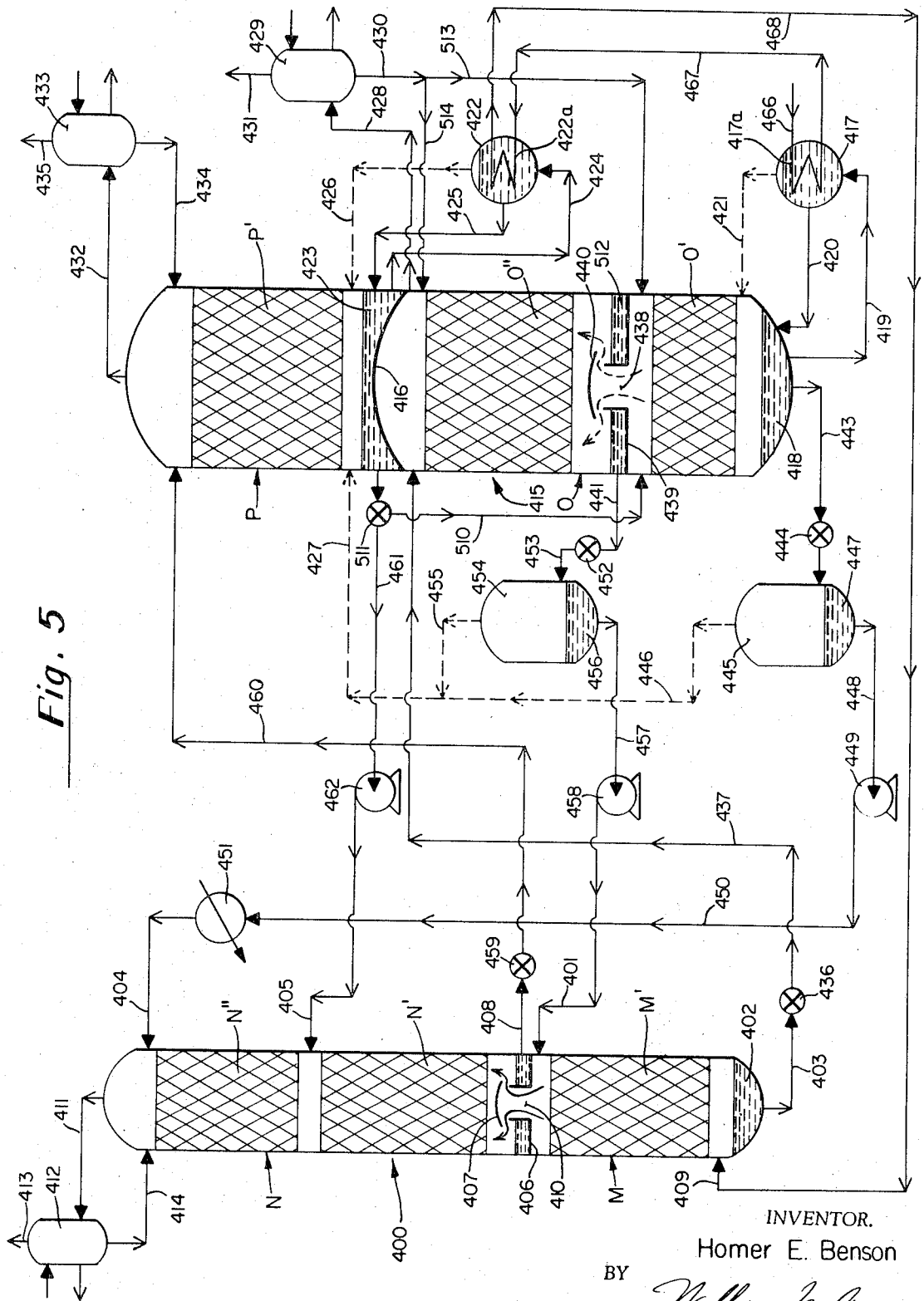

FIG. 5 is a diagrammatic flow sheet illustrating another embodiment of the invention similar to that shown in FIG. 4.

Figure 6:
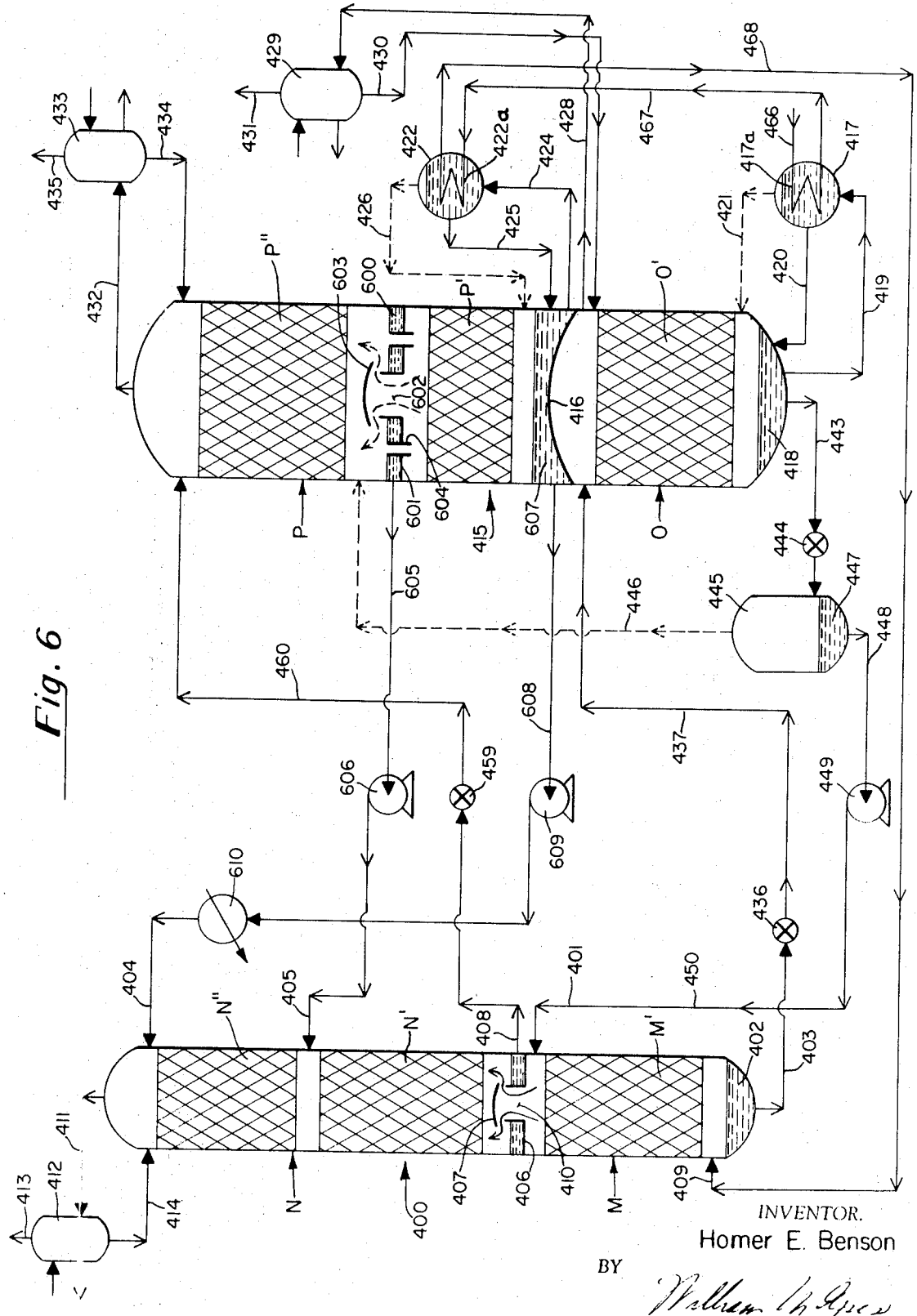

FIG. 6 is a diagrammatic flow sheet illustrating another embodiment of the invention adapted for the treatment of hot feed gases employing two separate absorption zones and two separate regeneration zones in which the upper section of the lower temperature absorption zone is supplied with cooled, more thoroughly regenerated solution from the lower section of the lower pressure, lower temperature regeneration zone.

Figure 7:
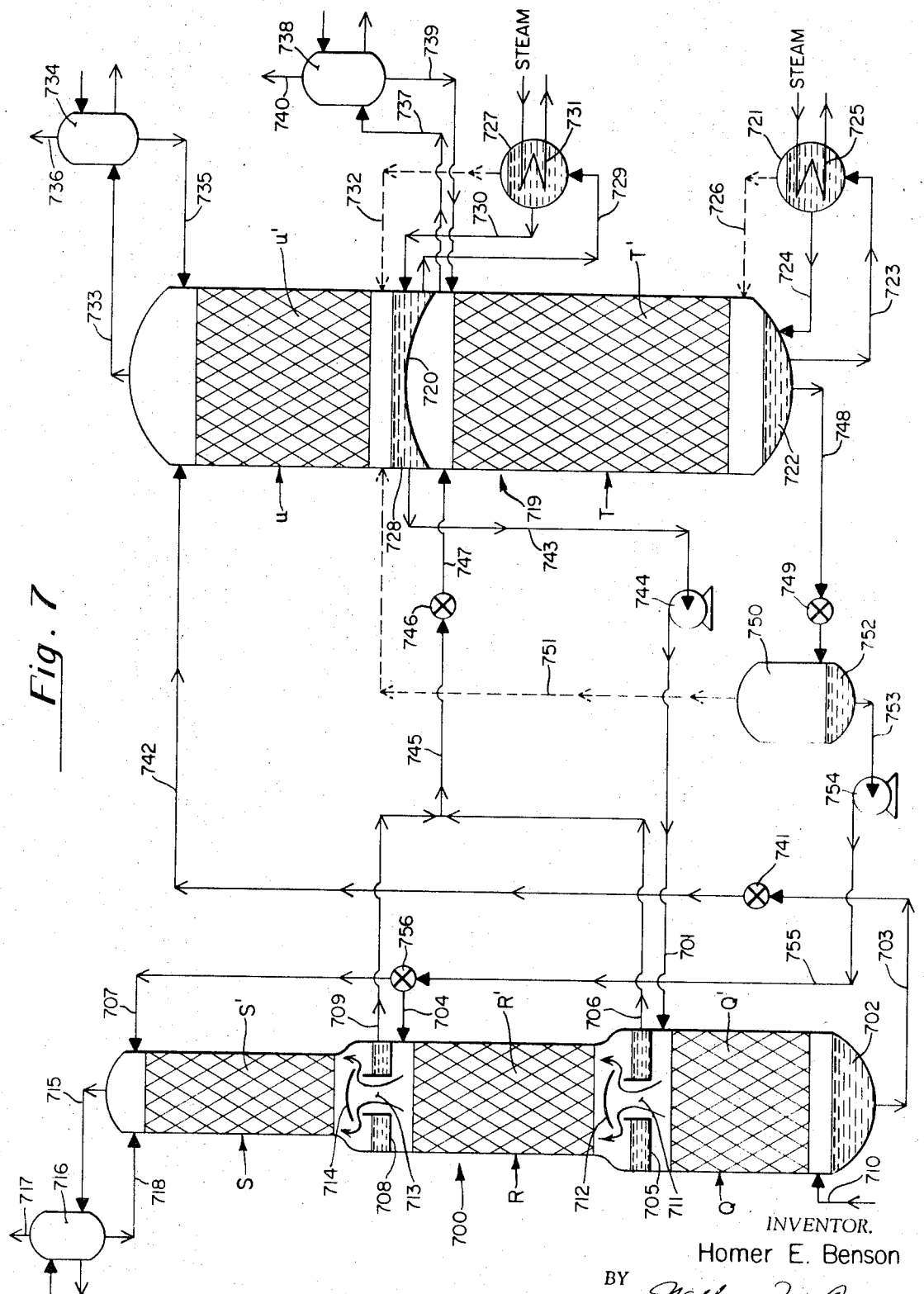

FIG. 7 is a diagrammatic flow sheet illustrating another embodiment of the invention adapted for the treatment of cool feed gases employing three separate absorption zones and two separate regeneration zones.

Figure 8:
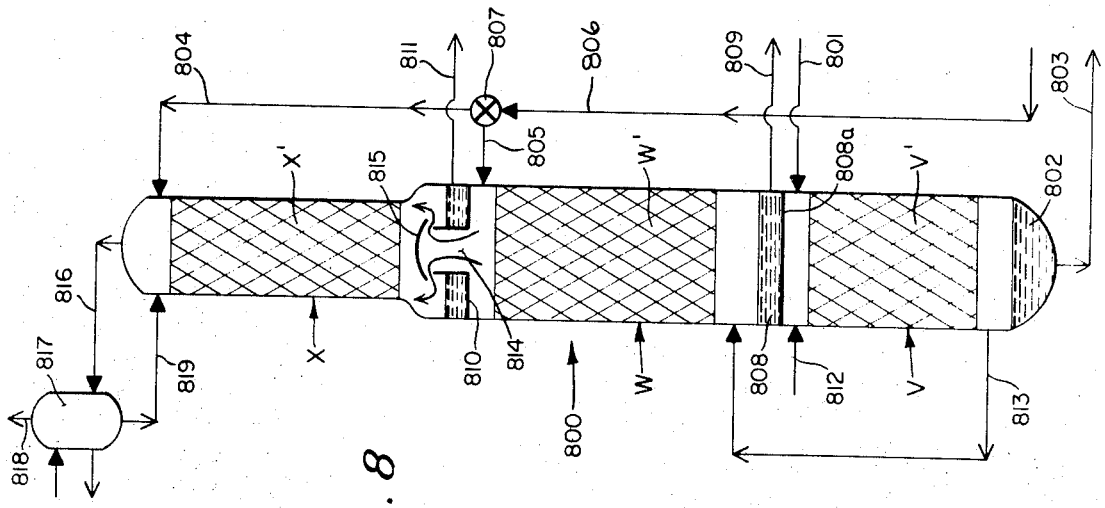

FIG. 8 is a diagrammatic flow sheet illustrating an embodiment of the invention in which the first absorption zone contacted by the gas mixture is arranged with concurrent flow of gas and liquid.

Figure 9:
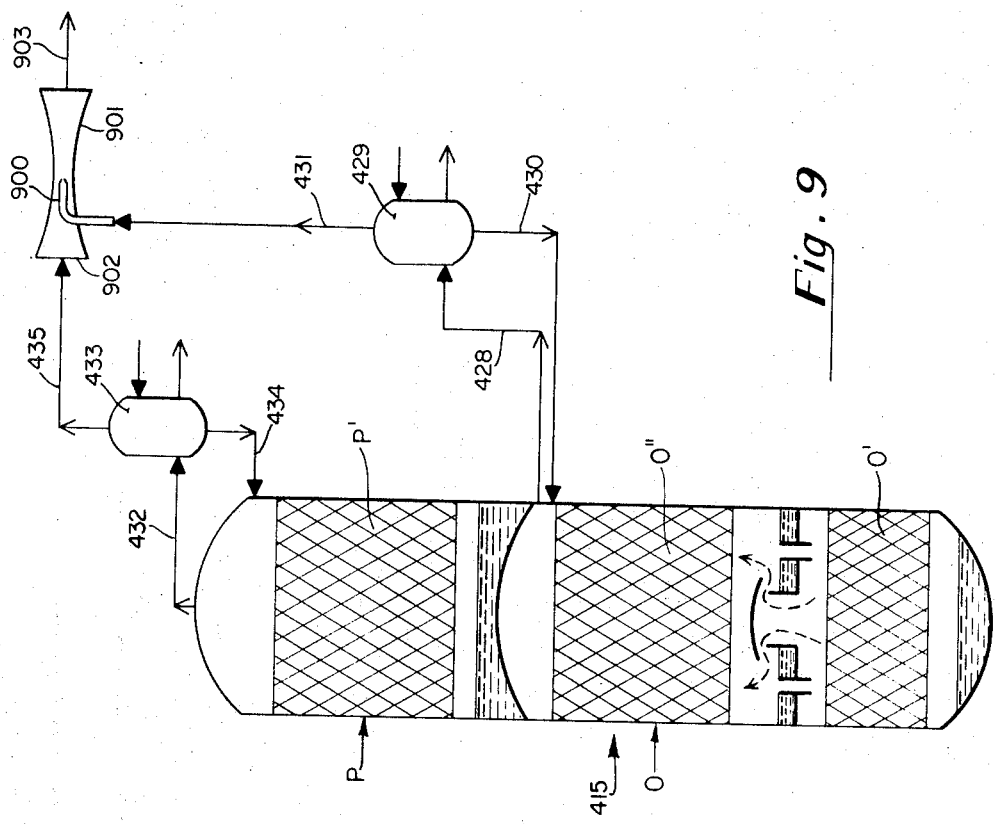

FIG. 9 is a diagrammatic flow sheet illustrating a system for combining the higher and lower pressure streams of effluent acid gas to produce a stream of intermediate pressure.

FIG. 10 is a diagrammatic flow sheet showing a system similar to that of FIG. 7, but adapted to reduce the residual acid gas content to lower levels.

Figure 1:
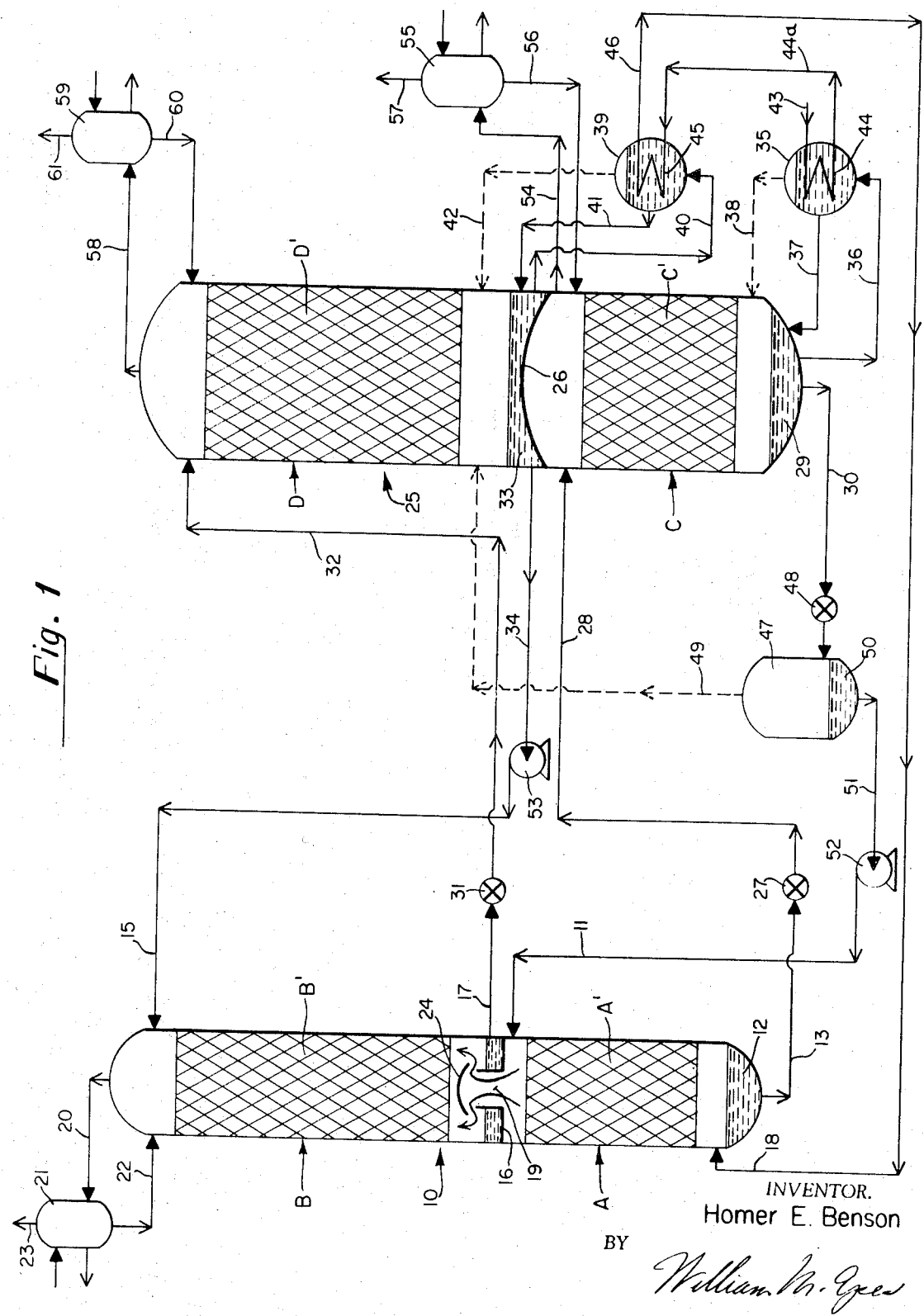

Reference is now made to FIG. 1 showing a system adapted for the treatment of a hot feed gas and particularly suitable when it is desired to reduce the concentration of acid gas down to levels of e.g. 1% or 2%. In FIG. 1, the reference numeral 10 refers generally to an absorber column adapted to operate at substantial super-atmospheric pressures and divided into two separate absorption zones generally designated by the letter A and the letter B. The cross-hatched section A' of the lower absorption zone A represents a suitable packing material for producing intimate gas-liquid contact, such as Raschig rings, Berl saddles, Intalox saddles, or other types of packing bodies exposing a large surface area of liquid to the gas stream flowing through the packing. Means other than packing materials, such as plates equipped with bubble caps or other means for insuring intimate contact between gas and liquid may be employed to achieve such intimate gas-liquid contact. Lower section A of the absorber is separately supplied with a regenerated stream of scrubbing solution such as an aqueous potassium carbonate solution by line 11 which flows down over the packing in section A' and collects at the bottom of the tower in sump 12 and is removed from the tower by line 13.

The upper zone B of the absorber tower is provided with packing or other suitable gas-liquid contact means designated by cross-hatched section B'. The upper section B is supplied with regenerated scrubbing solution by line 15 which flows countercurrently to the gas stream through packing B' and collects at the bottom of section B on a collector plate 16 and is separately withdrawn from the bottom of zone B by line 17.

The gas stream, containing $CO_2$ and/or $H_2S$, enters the bottom of tower 10 by line 18 and flows countercurrently to the descending liquid through packed section A' and then passes through a chimney 19 provided in collecting plate 16 and then flows countercurrently to the descending liquid through packed section B' of the upper zone B of the absorber, and leaves the absorber in a purified condition through line 20 at the top. If necessary, the gas stream leaving the absorber by line 20 is passed through a condenser 21 where water vapor is condensed out to maintain a proper water balance in the solution. The aqueous condensate from condenser 21 may be returned to the top of the absorber by line 22. The purified gas passes out of the condenser by line 23 for any desired use.

It will be noted that zone A and zone B of the absorber 10 are entirely separate from one another with respect to the flow of scrubbing solution. That is, each section is separately supplied with its own stream of scrubbing solution, and each stream of scrubbing solution is separately withdrawn from each zone. Thus, zone A is supplied with solution by line 11 and solution is withdrawn from zone A by line 13. Zone B is supplied with solution by line 15 and withdrawn from zone B by line 17. It will be noted that the solution flowing down through zone B is prevented from entering zone A by collector plate 16 and by a deflector cap 24 positioned over the chimney 19 which permits gas to pass upwardly from zone A to zone B while preventing the flow of solution from zone B to zone A.

Regeneration of the solution occurs in the regeneration column generally designated by the reference numeral 25 having two separate zones, the bottom, higher temperature, super-atmospheric pressure zone being designated generally by the letter C and the upper, lower temperature, lower pressure zone being designated generally by the letter D. The higher temperature, higher pressure zone C is separated from the lower pressure, lower temperature zone D by a dome 26, preventing communication between the two zones.

Higher temperature, higher pressure zone C is separately supplied with scrubbing solution from the bottom of absorber zone A by line 13, pressure letdown valve 27 and line 28. Solution introduced into the top of zone C flows downwardly over packed section C' countercurrently to upwardly flowing stripping steam, collects in sump 29 at the bottom of zone C and is withdrawn by line 30.

Zone D of the regenerator is separately supplied with solution leaving the bottom of zone B of the absorber by line 17, pressure letdown valve 31, and line 32. The solution flows down through packed section D' and collects in sump 33 at the bottom of section D, and is separately withdrawn by line 34.

Section C of the regenerator is supplied with stripping steam by reboiler 35 through which scrubbing solution from sump 29 is circulated by lines 36 and 37. Steam generated in reboiler 35 is introduced into the bottom of zone C by line 38.

Zone D of the regenerator is supplied wtih stripping steam by reboiler 39 through which scrubbing solution from sump 33 is circulated by lines 40 and 41. Steam generated in reboiler 39 is introduced into the bottom of zone D by line 42. Reboilers 35 and 39, in the embodiment illustrated in FIG. 1, are heated by raw process gas which may, for example, be a hot, $CO_2$-containing gas saturated with water vapor from a steam-reforming or partial oxidation system. The hot process gas enters reboiler 35 by line 43, transfers heat to the scrubbing solution by means of coil 44, and then passes in series by line 44a to reboiler 39 where it transfers heat to the scrubbing solution by means of coil 45, leaves reboiler 39 by line 46, and then is fed into the bottom of absorber 10 by line 18.

As well as being supplied with stripping steam by reboiler 39, section D of the regenerator is supplied with a portion of its stripping steam requirements by means of steam resulting from the flashing of solution in flash vessel 47. The flashed steam generated in vessel 47 results from reducing the pressure on the hot solution leaving regenerator zone C at a temperature and corresponding pressure above the atmospheric boiling temperature of the regenerated solution by line 30. Solution in line 30 passes through pressure letdown valve 48 and into flash vessel 47 where the pressure is reduced to approximately that prevailing in the lower pressure, lower temperature regeneration zone D. As a result of the reduction in pressure, steam is evolved from the solution and is conducted by line 49 to the bottom of regeneration zone D to serve as stripping steam. If, for example, zone C is operated at a pressure of 30 pounds per square inch absolute while zone D is operated at a pressure of 17 pounds per square inch absolute (as measured at the bottom of zone D), the pressure on the solution leaving zone C by line 30 may be reduced to about 18 pounds per square inch absolute, and the steam generated will then travel under its own head into the bottom of zone D by line 49.

The evolution of steam in flash vessel 47 is, of course, endothermic and results in cooling of the solution. The cooled solution collecting at the bottom of vessel 47 in sump 50 is conducted by line 51, recirculation pump 52 and line 11 back to the top of absorption zone A.

The liquid collecting at the bottom of regeneration zone D is withdrawn by line 34 and recirculated by recycle pump 53 and line 15 to the top of absorption zone B.

The mixture of desorbed acid gas and steam collecting at the top of regeneration zone C is withdrawn by line 54, passed through condenser 55 where sufficient steam is condensed to maintain the proper water balance in the system, sufficient aqueous condensate being refluxed back into the top of regeneration zone C by line 56. The gaseous effluent from the condenser, consisting largely of acid gas, is removed by line 57.

The mixture of steam and desorbed acid gas collecting at the top of regeneration zone D is removed by line 58 and passed through condenser 59 where steam is condensed and sufficient condensate refluxed to maintain the proper water balance, the aqueous condensate being refluxed back into the top of zone D by line 60. The gaseous effluent from the condenser, consisting largely of acid gas, is removed by line 61.

EXAMPLE 1

The operation of the system shown in FIG. 1 will now be described for a typical application in which a raw, hot feed gas, saturated with water vapor, is fed by line 43 through reboiler coil 44 of reboiler 35. This typical feed gas employed results from the steam reforming and carbon monoxide shift of natural gas. The gas leaves the shift reactor at a total pressure of 380 pounds per square inch gage and a temperature of 230° C., with a high steam content, and contains about 18% $CO_2$. Prior to delivery to the $CO_2$ scrubbing system, this gas stream is employed for other process uses and reaches the $CO_2$ scrubbing system and enters reboiler 35 at 159° C. The heat recovered from the process gas in reboiler 35 is sufficient to supply the steam stripping requirements of regeneration zone C.

After leaving reboiler 35, the raw process gas at a somewhat lower temperature, i.e. 136° C., is fed through coil 45 of reboiler 39 where still further amounts of heat are recovered from the process gas to provide a portion of the steam stripping requirements of regeneration zone D, the steam generated in reboiler 39 being delivered to zone D by line 42.

The process gas, at a temperature of 131° C., is then conducted by line 46 to absorber tower 10 and fed into the bottom of the tower by line 18.

The $CO_2$-containing gas at a flow rate of 16,800 pound mols per hour (lb. mols/hr.) of dry gas and 1,982 lb. mols/hr. of water vapor enters absorber tower 10 at a total pressure of 369 pounds per square inch gage and with a $CO_2$ partial pressure of about 64 pounds per square inch. The gas mixture first contacts aqueous alkaline scrubbing solution in absorption zone A introduced into the top of zone A through line 11 at the rate of 157,000 gallons per hour. The typical scrubbing solution employed is a 30% by weight aqueous solution of potassium carbonate containing 3% diethanolamine, and is introduced into the top of zone A at a temperature of 109° C., or approximately at the atmospheric boiling temperature of the regenerated solution. The solution entering the top of zone A is, of course, lean in $CO_2$, having been regenerated by steam stripping in regeneration zone C. The solution leaving the bottom of Zone A will be rich in $CO_2$, while the gas leaving the top of zone A through chimney 19 will be partially depleted in $CO_2$, but because of the high initial partial pressure of $CO_2$, will still contain a substantial $CO_2$ concentration, viz. 10.6%. The $CO_2$ partial pressure in the gas entering the bottom of zone A is 64 pounds per square inch while the $CO_2$ partial pressure entering absorption zone B is 37 pounds per square inch.

In zone B, the $CO_2$-containing gas contacts a separate stream of regenerated potassium carbonate scrubbing solution of the same composition as in zone A, i.e. 30% $K_2CO_3$ plus 3% diethanolamine, fed into the top of the zone by line 15 at 108° C., or near the atmospheric boiling temperature of the regenerated solution at the rate of 152,000 gallons per hour.

In zone B, most of the remaining $CO_2$ is absorbed, and the gas leaving the top of the absorber by line 20 contains 1% $CO_2$.

Under the conditions described, absorption zone A is established as the higher temperature absorption zone with the scrubbing solution leaving the zone through line 13 at a temperature of 128° C., substantially above the atmospheric boiling temperature of the solution after regeneration. The solution is heated in zone A from its inlet temperature of 109° C. to its outlet temperature of 128° C. through a combination of the heat of absorption of the $CO_2$ in the scrubbing solution and the heat transferred from the hot, saturated gas. The saturated gas stream which enters zone A at 131° C. is cooled rapidly by efficient, direct heat exchange with the solution, and leaves zone A through chimney 19 at a temperature close to the inlet temperature of the solution to zone A. viz. 109° C.

Under these conditions, on the other hand, zone B is established as a lower temperature absorption zone. Since the solution and the gas stream both enter zone B at about the same temperature (i.e. 108° to 109° C.), no heating of the solution by heat transfer from the gas occurs. However, some heat will be liberated in the solution as most of the remaining $CO_2$ is absorbed. This results in an increase in the solution temperature from its inlet temperature of 108° C. to an outlet temperature of 117° C. as the solution passes through zone B.

The hot solution leaving zone A by line 13, at a temperature of 128° C., is conducted by line 28 to regeneration zone C after passing through pressure letdown valve 27.

In regeneration zone C, the pressure is reduced to a pressure above atmospheric, but substantially lower than that prevailing in the absorber, viz. a pressure of 21 pounds per square inch gage as measured at the bottom of zone C. The solution is then subjected to steam stripping in the packed section C' of zone C. After such steam stripping in zone C, the lean, regenerated solution is withdrawn from the bottom of zone C by line 30 at a temperature of 127° C., and is then conducted to a flash tank 47 after passing through a pressure letdown valve 48 where the pressure is reduced to a pressure that is slightly above that prevailing in zone D, e.g. one pound per square inch higher. As the solution enters flash tank 47 above its atmospheric boiling temperature, substantially pure steam is evolved from the solution at the rate of 43,300 lbs./hr. Very little $CO_2$ will be evolved since the $CO_2$ content of the solution has been stripped to a low level in regeneration zone C. The steam evolved in flash tank 47 then travels under its own pressure through line 49 to the bottom of regeneration zone D to serve as stripping steam.

The flashed solution which collects at the bottom of tank 47 in sump 50 is cooled to a temperature of 109° C. (approximately the atmospheric boiling temperature of the regenerated solution) through the highly endothermic evolution of steam occurring in the flash tank. The cooled solution is then recirculated by recirculation pump 52 and line 11 to the top of absorption zone A.

The solution, rich in $CO_2$, leaving the bottom of absorption zone B by line 17, is conducted to the top of regeneration zone D by line 32 after passing through pressure letdown valve 31. Regeneration zone D is maintained at approximately atmospheric pressure at the top of zone D with a slightly higher pressure at the bottom of zone D (i.e. 2 to 3 pounds per square inch higher) due to the pressure drop through the packed section D'. As the solution enters the top of regeneration zone D through line 32 at a temperature of 117° C., $CO_2$ and substantial quantities of steam are evolved due to the reduction in pressure as the solution passes from the high pressure absorption zone B to regeneration zone D maintained at essentially atmospheric pressure. The evolution of steam and $CO_2$ from the solution causes cooling of the solution to about 99° C. The solution then travels down through packed section D' and is there subjected to steam stripping to remove further quantities of $CO_2$. The lean, regenerated solution collects in sump 33 at the bottom of regeneration zone D from which it is recirculated at a temperature of e.g. 108° C. by line 34, recirculation pump 53, and line 15 to the top of absorption zone B.

The overall effect of the system illustrated in FIG. 1, with zone A operating as a higher temperature absorption zone, and zone B operating as a lower temperature absorption zone, and with zone C operating as a higher pressure, higher temperature regeneration zone, and zone D operating as a lower pressure, lower temperature regeneration zone, is the recovery and effective utilization of (1) the heat content of the raw process gas entering the absorber and (2) a portion of the heat of absorption of the acid gas in the solution. Both of these sources of heat in previous systems have been completely or at least partially wasted. In the system of FIG. 1, absorption zone A is, in effect, an accumulator of the heat of absorption of the acid gas absorbed in that zone, and an accumulator of the heat content of the raw process gas that is transferred to the solution in zone A. By regenerating the hot solution from zone A in a higher temperature regeneration zone, there is produced a lean, regenerated solution at an elevated pressure. When the pressure is reduced on this solution, as in flash tank 47, in effect the heat accumulated in the solution in absorption zone A is released in the form of useful stripping steam containing little or no $CO_2$ and at a pressure such that it may be fed directly into the bottom of the lower pressure regeneration zone D and utilized in zone D as effective stripping steam, replacing a substantial portion of the stripping steam that would otherwise be produced in reboiler 39.

In the illustrative Example 1 given above, the amount of external steam required in the system, as measured by the total amount of steam which ordinarily would be generated in reboilers 35 and 39, is reduced by approximately 42%. This reduction in the external steam requirements not only conserves the heat content contained in the process gas for other uses, but also correspondingly reduces the size of the reboilers 35 and 39, which are an expensive part of the plant since they must usually be constructed of expensive metals such as stainless steel. Overhead condensers 55 and 59 are also substantially reduced in size in direct proportion to the reduction in the amount of steam generated in the reboilers.

Still another reduction in the capital cost of the scrubbing plant made possible by the system of the invention is a substantial decrease in the volume of packing required in regeneration zone C. This results from the fact that the rate of desorption is substantially increased by the higher operating temperature of zone C which, of course, reduces the required amount of packing.

Figure 2:
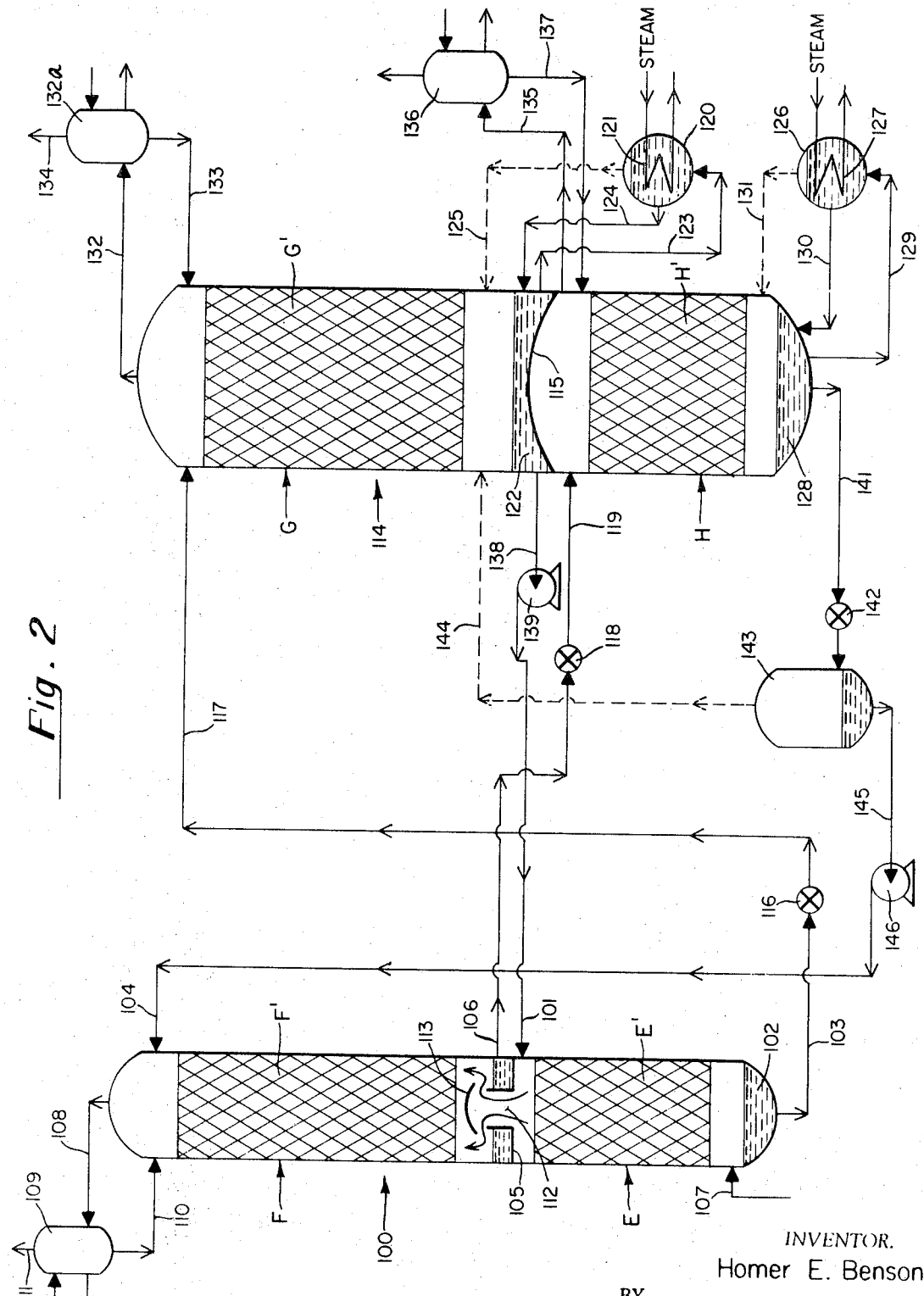
FIG. 2 is a diagrammatic flow sheet illustrating another embodiment of the invention and adapted for the treatment of cool feed gases, and employing two separate absorption zones and two separate regeneration zones.

Reference is made to FIG. 2 of the drawings which illustrates an embodiment of the invention adapted to treat a cool feed gas which tends to abstract heat from, rather than transfer heat to, the scrubbing solution. In FIG. 2, the absorption is carried out in absorption tower generally indicated by the reference numeral 100 operated under substantial superatmospheric pressure and having two separate absorption zones, the lower of which is generally designated by the letter E and the upper of which is generally designated by the letter F. Absorption zone E is separately supplied with scrubbing solution through line 101 which flows down through cross-hatched section E' provided with packing or other suitable means for maintaining intimate gas-liquid contact, collects in sump 102 at the bottom of the tower and is separately withdrawn by line 103. The upper zone of the absorber F is separately supplied with scrubbing solution through line 104 which flows down over cross-hatched section F' similarly equipped with suitable gas-liquid contact means such as packing or contact plates, and collects on collecting plate 105 at the bottom of zone F, and is separately withdrawn from zone F by line 106. The raw gas mixture containing acid gas to be removed is introduced by line 107 into the bottom portion of absorption zone E and flows up through zone E and zone F in series, leaving the top of the tower by line 108. If desired, the gas stream leaving the absorber by line 108 may be passed through a condenser 109 where water vapor may be condensed out to maintain the proper water balance in the solution. The aqueous condensate from the condenser 109 may be returned to the absorber by line 110. The purified gas passes out of the condenser by line 111 for any desired use.

The gas stream passes from the top of absorption zone E to the bottom of absorption zone F through chimney 112 which is provided in collecting plate 105. Solution descending through packed section F' is prevented from flowing into the lower zone E by a deflector cap 113. As in the embodiment shown in FIG. 1, the two absorption zones in the absorber 100 are maintained separate from one another with respect to liquid flow while the gas stream, on the other hand, passes in series in successive contact with both absorption zones.

Regeneration of the solution is accompanied in a regeneration tower designated generally by the reference numeral 114 provided with two separate regeneration zones. The upper regeneration zone, designated generally by the letter G, is provided with a cross-hatched section G' containing packing or other gas-liquid contact means. The lower regeneration zone, designated generally by the letter H, operated at a higher pressure and correspondingly higher temperature, has a cross-hatched section H' similarly equipped with packing or other suitable contact means. Regeneration zones G and H are separated from one another by a dome 115 which prevents communication between the two zones.

Scrubbing solution from the bottom of absorption zone E, containing absorbed acid gas is conducted by line 103, pressure letdown valve 116, and line 117 to the top of regeneration zone G. Scrubbing solution from the bottom of absorption zone F, containing absorbed acid gas is conducted by line 106, pressure letdown valve 118, and line 119 to the top of regeneration zone H.

Regeneration zone G is supplied with stripping steam by means of reboiler 120 supplied with a steam coil 121. Solution collecting at the bottom of regeneration zone G in sump 122 is recirculated through the reboiler by lines 123 and 124. Steam generated in the reboiler is fed into the bottom of regeneration zone G by line 125.

Regeneration zone H is supplied with stripping steam by means of reboiler 126 equipped with steam coil 127. Solution collecting at the bottom of zone H in sump 128 is circulated through reboiler 126 by lines 129 and 130. Steam generated in reboiler 126 is fed into the bottom of regeneration zone H by line 131.

Steam and acid gas evolved at the top of regeneration zone G is removed by line 132 and conducted to a condenser 132a where steam is condensed and sufficient condensate refluxed to maintain the proper water balance in the system, the aqueous condensate being refluxed back into the top of zone G by line 133. The gaseous effluent, consisting mostly of acid gas, is removed by line 134.

Steam and acid gas collects at the top of regeneration zone H, is removed by line 135 and passed through condenser 136 where steam is condensed and sufficient condensate refluxed to maintain the proper water balance in this section of the system, the aqueous condensate being refluxed back into the top of zone H by line 137.

Regenerated solution, now lean in acid gas, is withdrawn from the bottom of regeneration zone G by line 138, and returned by recycle pump 139 and line 101 to the top of absorption zone E.

Regenerated solution from the bottom of higher pressure, higher temperature regeneration zone H is removed by line 141, and after passing through pressure letdown valve 142, is introduced into flash tank 143 where, under the reduced pressure prevailing, steam is evolved, the cooled solution collecting at the bottom of tank 143 and the evolved steam being conducted by line 144 to the bottom of regeneration zone G for utilization as stripping steam. The cooled solution collecting in tank 143 is conducted by line 145, recycle pump 146 and line 104 to the top of absorption zone F.

EXAMPLE 2

The operation of the system shown in FIG. 2 will now be described with reference to a typical application involving the purification of a raw natural gas stream at a flow rate of 100 million cubic feet per day recovered at the wellhead at a total pressure of 1,000 pounds per square inch and containing 25% $CO_2$ and 5% $H_2S$, the partial pressure of the acid gases ($CO_2+H_2S$) being 300 pounds per square inch. Such a gas mixture, at a temperature of 20° C. is fed into the bottom of absorber tower 100, maintained at 1,000 pounds per square inch, by line 107, and passes in series through packed section E' of absorption zone E, through chimney 112 into the packed section F' of absorption zone F, and then out of the top of the tower through line 108. Regenerated scrubbing solution, consisting of a 30% by weight potassium carbonate solution containing 3% by weight of diethanolamine, enters the top of zone E at 106° C., approximately the atmospheric boiling temperature of the regenerated solution at a flow rate of 150,000 gallons per hour. As the hot solution meets the upwardly flowing, cool feed gas, rapid and efficient heat exchange takes place as a result of the direct contact in the packed section E'; heat is abstracted from the solution to heat and saturate the gas sream. Cooling of the solution by the gas stream is offset by the liberation of the heat of absorption of the acid gas in the scrubbing solution. Under the conditions given, the cooling and heating effects essentially offset one another, and the solution leaves the bottom of absorption zone E by line 103 at approximately its inlet temperature, viz 105° C. The gas leaves the top of section E heated approximately to the inlet temperature of the solution (viz 106° C.), and saturated with water vapor.

In upper absorption zone F, regenerated solution from regeneration zone H (also consisting of a 30% by weight aqueous potassium carbonate solution containing 3% diethanolamine) is introudced into the top of zone F at a temperature of 107° C. at a flow rate of 150,000 gallons per hour. Since the gas entering the bottom of zone F is at approximately the same temperature as the incoming solution entering through line 104, the gas mixture neither transfers heat to, nor abstracts heat from, the scrubbing solution, leaving the top of zone F approximately at the same temperature as it entered at the bottom of zone F. However, by virtue of the heat of absorption of the acid gas in the scrubbing solution, the temperature of the solution is heated to approximately 118° C., substantially above the atmospheric boiling temperature of regenerated solution. The purified natural gas stream, containing 0.5% $CO_2$ and about 10 parts per million $H_2S$, leaves the absorber tower by line 108.

There is in this way established a lower temperature absorption zone E in which the cool gas is saturated and heated while abstratcing heat from the solution, and a higher temperature zone F in which the solution is in contact with the heated, saturated gas, and is heated above its inlet temperature through the heat liberated by absorption of acid gas in the solution.

Scrubbing solution leaves the bottom of absorption zone E by line 103 at 105° C., and after passing through pressure letdown valve 116 and line 117, is fed to the top of regeneration zone G. There it evolves a portion of its $CO_2$ and $H_2S$ and some steam as it undergoes reduction in pressure from that prevailing in the absorber tower to substantially atmospheric pressure prevailing in regeneration zone G. The solution then passes down through packed section G' where further quantities of $CO_2$ and $H_2S$ are removed by means of stripping steam introduced by lines 125 and 144, and the regenerated solution collecting in sump 122 is then recycled by recycle pump 139 back to the top of the low temperature absorption zone E without cooling.

The solution leaving the bottom of higher temperature absorption zone F by line 106 at 118° C., after passing through pressure letdown valve 118, is introduced into higher temperature, higher pressure regeneration zone H which is operated at a superatmospheric pressure of 10 pounds per square inch gage at the top of packed section H' and at a pressure of 12 pounds per square inch gage at the bottom of packing H'. The solution travels down through packed section H' where it is contacted with stripping steam, and $CO_2$ and $H_2S$ are desorbed. The regenerated solution collects at the bottom of regeneration zone H in sump 128 at a temperature of 118° C., substantially above the atmospheric boiling temperature of the solution. The hot solution is conducted by line 141 through pressure letdown valve 142 and into flash tank 143 where the pressure is reduced to a pressure just slightly above that prevailing in lower temperature, lower pressure regeneration zone G. By virtue of the pressure reduction, substantially pure steam is evolved at the rate of 25,300 lbs./hr., containing little or no $CO_2$ or $H_2S$, which is conducted by line 144 to the bottom of regeneration zone G where it is effectively utilized as stripping steam. The solution collecting in tank 143 at a temperature of 107° C. is then conducted by line 145, recycle pump 146, and line 104 to the top of absorption zone F.

In the system shown in FIG. 2, the overall effect of the two absorber zones operating at different temperatures, and the two regeneration zones operating at different pressures and correspondingly different temperatures, is that the heat of absorption of the acid gases in the scrubbing solution is effectively recovered in higher temperature absorption zone F and then converted into useful stripping steam by regenerating the solution from zone F in a higher temperature, higher pressure regeneration zone H, producing a hot, regenerated solution substantially above its atmospheric boiling temperature which, upon pressure release in flash tank 143, produces steam virtually free of $CO_2$ and $H_2S$ usable as stripping steam in lower temperature, lower pressure regenerator G. The stripping steam derived at the rate of 25,300 lbs./hr. by flashing the solution regenerated in regeneration zone H replaces a substantial portion of the stripping steam which otherwise must be supplied from external sources. The savings in externally generated steam (i.e. steam normally generated in reboilers 120 and 126) amounts approximately to 20% of the total external steam normally required. Furthermore, savings in capital cost are similarly achieved by reduction in size of the reboilers, reduction in the size of the overhead condensers, and by reduction in the amount of packing or other gas-liquid contact means in the high pressure, high temperature zone H of the regenerator. As in FIG. 1, at the higher temperature prevailing in zone H, the desorption reaction occurs more rapidly, thus reducing the required volume of packed section H'.

Still another advantage of the system of the invention as applied to $CO_2$-$H_2S$ mixtures is that the $H_2S$ tends to be concentrated in the effluent from the regenerator serving the first absorption zone contacted by the solution. This occurs because of the greater rapidity at which $H_2S$ is absorbed in alkaline scrubbing solutions in contrast to $CO_2$ which is generally absorbed at a considerably lower rate. Thus, in Example 2 given above, the effluent from lower pressure, lower temperature regeneration zone G serving the first absorption zone E will be much richer in $H_2S$ than the effluent from higher pressure regeneration zone H serving the second absorption zone F. In the example given, the composition of the effluent from zone G may be of the order of 28% $H_2S$ and 72% $CO_2$, while the effluent from zone H may contain 2% $H_2S$ and 98% $CO_2$. This concentration of the $H_2S$ in one of the effluent streams greatly facilitates the further treatment and/or recovery of the $H_2S$.

In order to obtain the advantages of the invention, the partial pressure of acid gas ($CO_2$ and/or $H_2S$) in the raw feed gas should be at least about 25 pounds per square inch, and preferably at least about 40 pounds per square inch. Such minimum partial pressures of acid gas are necessary, first, because the solution outlet temperature from the higher temperature absorption zone is above the atmospheric boiling temperature of the regenerated solution, producing a substantial back pressure of acid gas from the solution and requiring a substantial partial pressure of acid gas in the gas phase to provide the needed driving force [1] for absorption to take place. Another consideration is that the gas stream enters the second absorption zone partially depleted in acid gas and encounters scrubbing solution which has already absorbed substantial amounts of acid gas. Here also, a substantial initial partial pressure of acid gas in the feed gas is necessary to provide the required driving forces for absorption in the second absorption zone.

As illustrated in connection with the systems shown in FIGS. 1 and 2, the invention is applicable both to cool and hot feed gases. An ideal feed gas for the system of the invention is one that is substantially higher in temperature than the atmospheric boiling temperature of the regenerated scrubbing solution, e.g. feed gases having temperatures of from 115° C. to 150° C., and which are substantially saturated with water vapor. Gases of this type, comprising hydrogen and carbon monoxide and containing high concentrations of $CO_2$ and sometimes also containing small amounts of $H_2S$, are commonly produced by the steam reforming of natural gas or naphtha under pressure, or by the partial oxidation of gaseous or liquid fuels under pressure. When hydrogen is the desired product gas, the $H_2$-CO mixtures are subjected to carbon monoxide shift, converting the carbon monoxide to hydrogen and more $CO_2$ by reaction with steam. Typical product gases from such operations leave the reforming furnace, partial oxidation unit, or water-gas shift reactor at elevated temperatures and pressures of from 100 to 1,500 pounds per square inch, and with $CO_2$ concentrations of from 5 to 35%. It will ordinarily be desirable to recover a portion of the heat contained in these very hot process gases before delivering them to the gas purification unit. Generally, these process gases will be delivered to the regenerator reboilers of the gas scrubbing unit at temperatures of from 150° C. to 180° C., and then delivered to the absorber generally at temperatures from 115° C. to 135° C. The $CO_2$ partial pressure in such feed gases will typically be of the order of 50 to 400 pounds per square inch.

A typical example of a cool feed gas to the absorber is a natural gas feedstock at elevated pressures containing $CO_2$ and/or $H_2S$ in substantial quantities. Many natural gas fields have been discovered in which the gas is delivered at the wellhead at pressures of e.g. 500 to 1,000 pounds per square inch, containing varying concentrations of $CO_2$ and/or $H_2S$. Many of these streams contain an acid gas partial pressure well in excess of 25 pounds per square inch. Acid gas partial pressures of from 250 to 500 pounds per square inch are not at all uncommon. Ordinarily, these gases are recovered from the well at approximately ambient temperature, and thus contain no sensible heat or latent heat of vaporization that may be recoverable in the system of the invention. However, as illustrated in FIG. 2, by employing the first absorption zone as a lower temperature zone which operates to heat and saturate the cool feed gas, the second zone may be operated as a higher temperature zone in which the heat of absorption of the solution serves to heat the solution above its atmospheric boiling temperature, which stored heat may be recovered as stripping steam.

Other cool feed gases containing relatively high partial pressures of $CO_2$ and/or $H_2S$ may be similarly treated.

In general, any regenerable aqueous alkaline scrubbing solution may be employed in the system of the invention. Particularly preferred are aqueous solutions of potassium carbonate, particularly relatively concentrated potassium carbonate solutions having potassium carbonate concentrations by weight of 15% to 45%, and preferably from about 22% to 35% (these concentrations by weight being calculated on the assumption that all the potassium present is present as potassium carbonate). Such potassium carbonate solutions are preferably activated by the addition of additives such as ethanolamines; alkali metal borates such as potassium or sodium borate; $As_2O_3$; amino acids such as glycine; or other additives which tend to in-

---

[1] The differential between the back pressure of acid gas from the solution and the partial pressure of acid gas in the gas phase.

crease the rates of absorption and desorption of acid gas in the potassium carbonate solution.

Particularly preferred among these activators for potassium carbonate solutions are the ethanolamines which are preferably added to the potassium carbonate solutions in amounts ranging from about 1% to 10% by weight, and preferably from about 2% to 6% by weight. Diethanolamine, $HN(CH_2CH_2OH)_2$, is preferred from the standpoints of cost, relatively low volatility, and effectiveness. However, monoethanolamine, $H_2NCH_2CH_2OH$, or triethanolamine, $N(CH_2CH_2OH)_3$, may also be employed in place of diethanolamine, or mixtures of any two or three of these ethanolamines may be employed as additives to potassium carbonate solutions.

In addition to the potassium carbonate solutions, with or without activators, other regenerable aqueous alkaline scrubbing solutions may be employed such as aqueous solutions of the ethanolamines or aqueous solutions of the alkali metal phosphates such as potassium phosphate.

If desired, two different scrubbing solutions may be employed, one in the circuit including the higher temperature absorber and higher temperature regenerator, and the other in the circuit including the lower temperature absorber and lower temperature regenerator. Where there is cross-flow of solution from the high-temperature side of the circuit to the lower temperature side of the circuit, as for example in the embodiment shown in FIG. 4, it is, of course, necessary to employ the same scrubbing solution throughout the system. It will, in fact, in the mapority of cases, be most convenient and economical to employ the same scrubbing solution throughout.

The mechanism of absorption will, of course, differ depending on the particular scrubbing solution employed. Using potassium carbonate solutions, for example, the following reactions occur during the absorption of the $CO_2$ and $H_2S$ respectively:

$$K_2CO_3 + CO_2 + H_2O \rightleftharpoons 2KHCO_3$$

$$K_2CO_3 + H_2S \rightleftharpoons KHS + KHCO_3$$

Regeneration, or desorption, is effected by decomposition of the bicarbonate and/or bisulfide formed during the absorption step.

Using an aqueous monoethanolamine solution, the reactions occurring may be presented as follows:

$$2HOC_2H_4NH_2 + CO_2 + H_2O \rightleftharpoons (HOC_2H_4NH_3)_2CO_3$$

$$2HOC_2H_4NH_2 + H_2S \rightleftharpoons (HOC_2H_4NH_3)_2S$$

Employing an aqueous potassium phosphate solution, the reactions may be represented as follows:

$$K_3PO_4 + CO_2 + H_2O \rightleftharpoons K_2HPO_4 + KHCO_3$$

$$K_3PO_4 + H_2S \rightleftharpoons K_2HPO_4 + KHS$$

As is apparent from the above, all of these reactions are reversible. They do not go to completion in either the absorption or the regeneration stages, and the scrubbing solution circulated is actually a mixture. In the case of potassium carbonate solutions, for example, the regenerated scrubbing solution fed to the absorber in the case of $CO_2$ absorption is a carbonate-bicarbonate mixture rich in carbonate, while the solution leaving the absorber is a mixture rich in bicarbonate. References herein to scrubbing solutions of potassium carbonate, ethanolamines, potassium phosphate, etc., are of course intended to include mixtures of these compounds with the reaction products formed during the absorption process.

The absorption zones are maintained at substantial superatmospheric pressures of at least 100 pounds per square inch gage, and preferably at least 200 pounds per square inch gage. Absorber pressures in typical applications of the invention will generally range from 250 to 1,500 pounds per square inch gage.

As stated previously, the solution outlet temperature from the higher temperature absorption zone should be higher than the atmospheric boiling temperature of the regenerated solution. The "atomspheric boiling temperature of the regenerated solution," as used herein, means the temperature at which the total pressure of water vapor and acid gas over the scrubbing solution, after being subjected to regeneration by steam stripping in the regeneration zone, is equal to one atmosphere absolute. Prior to regeneration, the scrubbing solution will have a somewhat lower atmospheric pressure boiling temperature because of the presence of a relatively high content of absorbed acid gas. The outlet temperature from the higher temperature absorption zone depends, of course, upon the solution inlet temperature and the amount of heat transferred to the solution from heat of absorption of the acid gases, and from sensible heat and latent heat of condensation of water vapor contained in the feed gas. Typically, the heat of absorption of acid gas may add sufficient heat to raise the solution temperature from 5° C. to 25° C. while the sensible heat and latent heat of condensation in a hot, saturated gas may be sufficient to raise the solution temperature from 5° C. to 35° C. Typically, depending on the concentration of acid gases, the sensible and latent heat content of the feed gases, and the solution inlet temperature, the solution outlet temperature from the higher temperature absorption zone may range from 5° C. to 45° C., but more usually from 10° to 30° C., higher than the atmospheric boiling temperature of the regenerated solution.

The solution inlet temperature to the higher temperature absorption zone will usually be approximately the same as the temperature of the solution leaving the flashing zone (e.g. flash tank 47 in FIG. 1). Since the flashing zone is operated at, or slightly above, atmospheric pressure, the scrubbing solution entering the higher temperature absorption zone will generally be at, or slightly higher than, the atmospheric boiling temperature of the regenerated solution. The solution leaving the flashing zone is preferably transferred to the high temperature absorption zone without cooling to avoid reducing the temperature level in that zone.

The temperature level in the lower temperature absorption zone may vary from a relatively cool temperature to a temperature only slightly below that of the higher temperature zone. In cases where the regenerated solution is not cooled as it travels from the lower temperature regeneration zone to the lower temperature absorption zone (as in the systems illustrated in FIGS. 1, 2, and 7), the lower temperature absorption zone will operate at a temperature relatively close to that of the higher temperature absorption zone.

In cases where the solution is cooled between the lower temperature regeneration zone and the lower temperature absorption zone (as in the systems illustrated in FIG. 3, 4, 4a, 5, and 6), the lower temperature absorption zone will, of course, operate at somewhat lower temperature levels. As will be explained in connection with FIGS. 3 to 6, cooling of the solution, particularly a moderate amount of cooling of the solution entering the top of the lower temperature absorption zone, is advantageous where it is desired to reduce the residual acid gas concentration in the purified gas to relatively low levels.

In many cases it will be preferable to carry out the process of the invention such that approximately the same amount of acid gas is absorbed in each absorption zone and such that approximately the same amount of scrubbing solution circulates through each absorption zone. With this arrangement, the solution flow through each regeneration zone will also be approximately equal. In some cases, however, it may be desirable to depart from this arrangement. For example, if most of the $CO_2$ removed from the purified gas is desired under a somewhat elevated pressure (e.g. 10 to 20 lbs./in.$^2$ gage), it may be desirable to do more of the regeneration in the higher pressure regeneration zone, in which case the solution flow to the higher pressure regeneration zone may be increased to the point that it makes up, for example, 75% of the total flow.

It is desirable, of course, in each absorption zone to utilize close to the full practical carrying capacity of the solution since the thermal efficiency drops off, and the required solution circulation rate increases if only a portion of the available solution carrying capacity is utilized. Thus, for example, when utilizing an aqueous potassium carbonate solution to absorb $CO_2$, it is desirable to employ a solution in both absorption zones which has been regenerated to a relatively lean potassium bicarbonate fraction [2] of e.g. about 25% to 40%, and to maintain a rich potassium bicarbonate fraction leaving each absorption zone of e.g. 65% to 85%.

The pressure in the higher pressure, higher temperature regeneration zone will generally be in the range of from 5 to 40 pounds per square inch gage, and more usually in the range of from 10 to 30 pounds per square inch gage. Generally, the higher the temperature of the solution entering the higher temperature regeneration zone, the higher will be the optimum regeneration pressure, and correspondingly, the higher the temperature of the solution leaving this zone. Often it will be desirable to maintain the temperature of the solution leaving the higher temperature zone approximately the same as the temperature of the solution which enters. The effect of maintaining a superatmospheric regeneration pressure is to conserve the heat accumulated in the solution and prevent it from being dissipated as a useless mixture of steam and $CO_2$ having no stripping value, which would occur if the solution were reduced to atmospheric pressure. By maintaining the solution under a moderate superatmospheric pressure during regeneration, the wasteful flashing of steam on pressure letdown of the unregenerated solution is minimized such that the stored heat content of the solution can be usefully employed by reducing the pressure after regeneration to produce essentially pure steam, virtually free of acid gas, effective as stripping steam in the lower pressure, lower temperature regeneration zone.

A practical limitation on the maximum pressure in the higher pressure regeneration zone is the amount of flash steam that can be utilized to advantage in the lower pressure regeneration zone. The higher the pressure in the higher pressure regeneration zone, the greater the amount of flash steam that will be produced as the pressure on the solution is reduced in the flash tank prior to recirculation of the solution to the higher temperature absorption zone. The amount of flash steam that can be usefully employed in the lower pressure regeneration zone will be limited in some cases, for example, by the necessity of maintaining the proper water balance in the lower pressure regenerator. In general, the greater the amount of flash steam injected, the greater the amount of condensation that will occur, diluting the solution, and this factor may set a limit on the amount of flash steam that may be practically injected as stripping steam in the lower pressure regenerator. This in turn may set a practical upper limit on the pressure at which the higher pressure regeneration zone is operated. It will generally not be advantageous to produce more flash steam than can be usefully employed in the lower pressure regenerator unless some other practical use for this steam exists in other parts of the plant.

The lower pressure, lower temperature regeneration zone is preferably maintained at or slightly above atmospheric pressure. Slightly elevated pressures of e.g. from one pound to 6 pounds per square inch gage (as measured at the top of the regeneration zone) may sometimes be desired if, for example, it is desired to supply $CO_2$ from the regenerator under pressure to another process such as the manufacture of urea by reaction with ammonia. Optimum thermal efficiency, however, is obtained when the lower pressure regenerator is operated as close as possible to atmospheric pressure to provide the maximum pressure differential between the higher and lower pressure regeneration zones.

Figure 3:
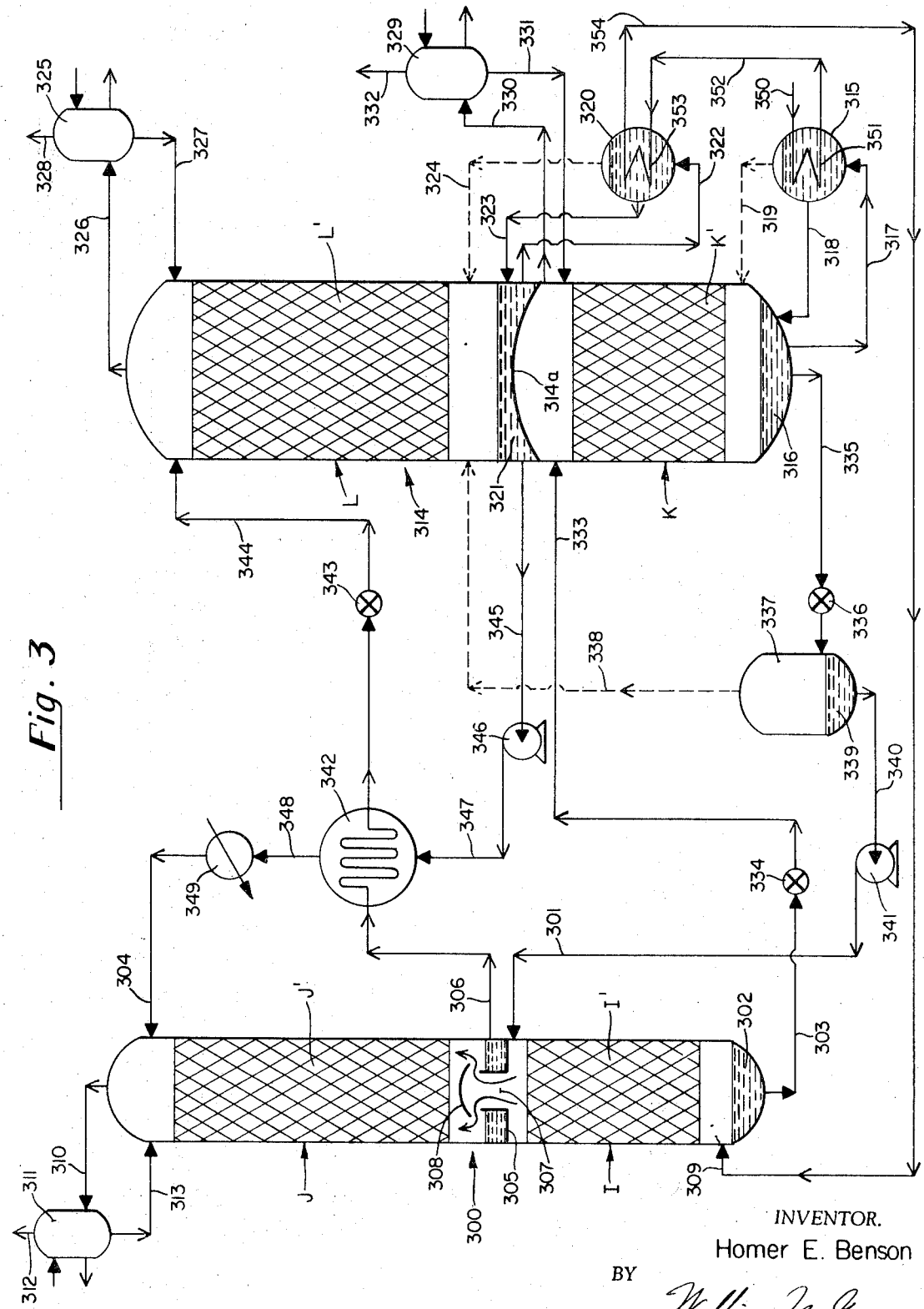
FIG. 3 is a diagrammatic flow sheet illustrating another embodiment of the invention adapted for the treatment of hot feed gases and employing two separate absorption zones and two separate regeneration zones in which the scrubbing solution in the second, lower temperature zone is cooled to reduce its temperature substantially below that of the first, higher temperature absorption zone.

Reference is now made to FIG. 3 of the drawings showing a system similar to that shown in FIG. 1 adapted for the treatment of a hot feed gas, except that before entering the lower temperature absorption zone, the entire scrubbing solution is subjected to cooling such that the lower temperature absorption zone may operate at a substantially lower temperature than the higher temperature absorption zone. As will be explained more in detail below, cooling of the solution in the lower temperature absorption zone may often be advantageous in order to improve the average driving forces in the lower temperature absorption zone, particularly when it is desired to reduce the residual acid gas in the purified gas stream to a low value such as from 0.01% to 0.2%.

In FIG. 3, reference numeral 300 refers generally to the absorption tower consisting of a higher temperature absorption zone I provided with a packed section I', and a lower temperature absorption zone J provided with a packed section J'. Zone I is separately supplied with scrubbing solution by line 301, and the spent scrubbing solution is withdrawn from sump 302 at the bottom of zone I by line 303. Zone J is supplied with cooled scrubbing solution by line 304. The scrubbing solution in zone J collects on collecting plate 305, and is withdrawn from the collecting plate by line 306.

Collecting plate 305 is provided with a chimney 307 permitting gas to flow from zone I to zone J. A deflector 308 prevents solution from zone J from entering zone I.

A hot, saturated gas is introduced into the bottom of zone I by line 309, travels up through packed section I', chimney 307, packed section J', and leaves the tower by line 310, passes through condenser 311 and leaves the system by line 312. Condensate is refluxed back into the tower by line 313. The solution is regenerated in regeneration tower indicated generally by the reference numeral 314 which contains a separate, higher pressure, higher temperature regeneration zone indicated by the letter K, and provided with a packed section K', and a lower pressure, lower temperature regeneration zone L provided with a packed section L'. Zones K and L are separated from one another by dome 314a which prevents communication between the two zones. Regeneration zone K is supplied with stripping steam by reboiler 315 through which solution is circulated from sump 316 at the bottom of zone K by means of lines 317 and 318, while steam raised in reboiler 315 is fed to regeneration zone K by line 319. A portion of the stripping steam required in regeneration zone L is supplied by reboiler 320 through which solution is circulated from sump 321 at the bottom of zone L by lines 322 and 323. Steam raised in reboiler 320 is fed into the bottom of regeneration zone L by line 324. Zone L is provided with overhead condenser 325 through which steam and acid gas collecting at the top of zone L is led by line 326. Condensate refluxes back into the top of zone L by line 327, while the condenser effluent, consisting mostly of acid gas, leaves by line 328.

Zone K is provided with overhead condenser 329 through which the mixture of steam and acid gas collecting at the top of regeneration zone K is conducted by line 330. Condensate is refluxed back into the top of zone K by line 331 while the gaseous effluent from the condenser, consisting mostly of acid gas, leaves by line 332.

Solution from the bottom of higher temperature ab-

---

[2] The "potassium bicarbonate fraction," as used herein, means the proportion of the original potassium carbonate ($K_2CO_3$) expressed in percent which has been converted to potassium bicarbonate by reaction with $CO_2$. For example, a solution having a potassium bicarbonate fraction of 25% is obtained by the conversion of 25 mol percent of the potassium carbonate content of the solution to potassium bicarbonate such that the ratio of potassium ions present as potassium carbonate to potassium ions present as potassium bicarbonate is 3 : 1. Since two mols of potassium bicarbonate are produced for each mol of potassium carbonate, the mol ratio of $K_2CO_3$ : $KHCO_3$ at a 25% bicarbonate fraction is 3 : 2.

sorption zone I is introduced by line 303 into the top of higher pressure regeneration zone K by line 333 after passing through pressure letdown valve 334. Regenerated solution at the bottom of regeneration zone K is withdrawn by line 335, and after passing through pressure letdown valve 336, passes into flash tank 337 where the pressure is reduced to approximately atmospheric pressure (just slightly above the pressure prevailing at the bottom of regeneration zone L). Steam evolved in flash tank 337 is conducted by line 338 to the bottom of lower pressure regeneration zone L where it serves as effective stripping steam. Cooled solution collecting at the bottom of flash tank 337 in sump 339 is conducted by line 340, recycle pump 341, and line 301 to the top of absorption zone I.

Solution leaving the bottom of absorption zone J by line 306 passes through a heat exchanger 342 where the relatively cool solution leaving the bottom of absorption zone J is heated by heat exchange with hot solution leaving the bottom of regeneration zone L at approximately its atmospheric boiling temperature. After passing through pressure letdown valve 343, the solution enters the top of regeneration zone L by line 344 and is subjected to steam stripping as it passes downwardly over packed section L'.

Regenerated solution leaves the bottom of zone L by line 345 and is recycled to the top of absorption zone J by recycle pump 346, line 347, heat exchanger 342, line 348, cooler 349, and line 304.

Hot, saturated gas is fed by line 350 through reboiler 315 containing heat coil 351, and then is led by line 352 through heating coil 353 or reboiler 320, and then is conducted by lines 354 and 309 into the bottom of absorption tower 300.

The operation of the system shown in FIG. 3 is similar to that shown in FIG. 1 except that the lower temperature absorption zone J is operated at a substantially lower temperature than the higher temperature absorption zone I. While in FIG. 1 the absorption solution enters the lower temperature absorption zone at approximately the atmospheric boiling temperature, in FIG. 3 the solution may enter zone J at any desired temperature below the atmospheric boiling temperature, such as temperatures of from 30° C. to 80° C. Since the solution is regenerated at approximately its atmospheric boiling temperature in regeneration zone L, it may be desirable to employ a heat exchanger (such as heat exchanger 342) between the absorption and regeneration zones to recover some of the heat from the hot, regenerated solution as the cool, spent solution is taken to the regeneration zone for steam stripping. At the same time, of course, the hot solution is partially cooled as it travels through the heat exchanger, reducing the duty on cooler 349 which brings the solution temperature down to the desired point.

EXAMPLE 3

The operation of the system of FIG. 3 may be illustrated by the following typical example involving the purification of a $CO_2$-containing gas stream where it is desired to have a residual $CO_2$ content of 0.1% in the purified gas.

The raw, hot gas stream enters reboiler 315 at a temperature of 172° C., saturated with water vapor, at a pressure of 371 lbs./in.$^2$ gage containing 18% $CO_2$ by volume. The gas stream leaves reboiler 315 at a temperature of 158° C., passes through reboiler 320, and leaves at a temperature of 131° C., at which temperature it enters absorber 300 by line 309 at a total pressure of 369 lbs./in.$^2$ gage, with a $CO_2$ partial pressure of 64 lbs./in.$^2$ and at a flow rate of 16,800 lb. mols/hr. of dry gas and 1,982 lb. mols/hr. of water vapor. The gas mixture travels through packed section I' where a portion of its $CO_2$ content is removed, the gas entering zone J containing a $CO_2$ concentration of 9.0% and having a $CO_2$ partial pressure of 33 lbs./in.$^2$. In zone I the gas stream encounters scrubbing solution fed into zone I through line 301 at a temperature of 109° C. and at a rate of 187,000 gallons per hour. The solution is heated in zone I by the combination of the heat of absorption of $CO_2$ and the heat contained in the gas stream to a temperature of 126° C. at which it leaves the bottom of zone I by line 303. The gas stream is cooled by heat exchange with the solution in packed section I', and enters zone J at approximately 109° C. The scrubbing solution in zone I is a 30% solution of potassium carbonate containing 3% by weight of diethanolamine.

Scrubbing solution is fed into the top of zone J by line 304 at a temperature of 70° C. and at a rate of 151,000 gallons per hour, the scrubbing solution in zone J being a 10% by weight solution of potassium carbonate containing 10% by weight of diethanolamine. Since the inlet solution temperature to zone J is lower than the inlet temperature of the gas stream, some heat is transferred from the gas stream to the solution, the gas stream leaving the top of zone J at approximately the inlet temperature of the solution to zone J, namely 70° C. Further heat is transferred to the solution in zone J by the heat of absorption of the $CO_2$. Due to the combined heating effects in zone J, the solution leaves the bottom of zone J by line 306 at a temperature of 86° C. Due to the lower temperature prevailing in zone J, there exists a lower back pressure of $CO_2$ from the scrubbing solution, and thus the $CO_2$ is reduced to a lower residual level in the gas stream leaving the top of the absorber tower, namely 0.1%.

The spent solution then passes through heat exchanger 342 where it undergoes heat exchange with hot regenerated solution at a temperature of 108° C. from lower pressure regeneration zone L. The spent solution leaves heat exchanger 342 at a temperature of 98° C., and after passing through pressure letdown valve 343, is regenerated in regeneration zone L maintained at 2 lbs./in.$^2$ gage at the top of packed section L', and at a pressure of 4 lbs./in.$^2$ gage at the bottom of packed section L'. Regenerated solution leaves zone L by line 345 at 108° C., is heat-exchanged with cooler, spent solution in heat exchanger 342 to lower its temperature to 95° C., and then is cooled to a temperature of 70° C., in cooler 349.

The hot solution leaving absorption zone I by line 303 at a temperature of 126° C., after passing through pressure letdown valve 334, is conducted to higher pressure regeneration zone K maintained at a pressure of 12 lbs./in.$^2$ gage at the top of packed section K', and 14 lbs./in.$^2$ gage at the bottom of section K'. After steam stripping in packed section K', the solution is withdrawn from zone K at a temperature of 120° C., and after passing through pressure letdown valve 336, is conducted to flash chamber 337 where the pressure is reduced to 5 lbs./in.$^2$ gage, and the evolved steam at the rate of 31,300 lbs./hr. is introduced into the bottom of zone L by line 338. The flashed solution collecting in tank 337 at a temperature of 109° C. is recycled to regeneration zone I by recycled pump 341.

In Example 3 above, the amount of external steam normally required in the system, as measured by the total amount of steam normally generated in reboilers 315 and 320, is reduced by approximately 23%. As in previous examples, this reduction in steam requirements reduces the size of the reboilers and correspondingly reduces the size of the overhead condensers 325 and 329. Substantial reductions in the amount of packed section K' are also achieved.

EXAMPLE 3a

Example 3 given above is repeated under substantially the same conditions, substituting, however, a scrubbing solution consisting of a 22% aqueous solution of potassium carbonate to which 11% by weight of $As_2O_3$ has been added for the 10% potassium carbonate-10% diethanolamine solution employed in the lower temperature absorption zone J and lower pressure regeneration zone L circuit. Operating under the same conditions, substantially the same results are obtained.

In the operation of the system shown in FIG. 3, if the solution entering the top of the absorber is cooled only slightly (e.g. to a temperature only 10° C. to 20° C. below the boiling temperature of the solution), heat exchanger 342 may be unnecessary, and may be bypassed or omitted.

Reference is now made to FIG. 4 of the drawings which shows a particularly preferred embodiment of the invention adapted for the treatment of a hot gas stream and for situations where it is desired to reduce the residual acid gas content to low levels of e.g. 0.02% to 0.3% by volume.

The embodiment shown in FIG. 4 is similar to that shown in FIG. 1 except that a third stream is employed in the absorber, entering the upper position of the lower temperature absorption zone in a cool, more thoroughly regenerated condition such as to reduce the back pressure of acid gas at the top of the lower temperature absorption zone to minimum levels.

In FIG. 4, the absorption tower, which is generally indicated by the reference numeral 400, comprises a higher temperature zone indicated generally by M, having a packed section M', and a lower temperature zone indicated generally by N, provided with a lower packed section N', and an upper packed section N''. Higher temperature absorption zone M is separately supplied with scrubbing solution through line 401. After passing through packed section M', scrubbing solution collects in sump 402 at the bottom of zone M and is withdrawn from the tower by line 403.

Lower temperature absorption zone N is supplied with scrubbing solution by lines 404 and 405. Line 404 supplies cool, more thoroughly regenerated solution to packed section N'', while line 405 supplies hotter, moderately regenerated solution to packed section N'. Scrubbing solution leaving packed section N'' mixes with scrubbing solution entering by line 405, and the combined streams of scrubbing solution flow downwardly over packed section N'.

Spent scrubbing solution collects at the bottom of zone N on collecting tray 406 provided with a deflector 407, and the scrubbing solution is withdrawn from the bottom of zone N by line 408.

Hot, saturated gas stream containing acid gas to be removed is introduced into the bottom of tower 400 by line 409, travels upwardly through zone M in contact with solution in packed section M', and then passes through chimney 410 in collecting plate 406. It then passes upwardly through zone N in contact with scrubbing solution in packed sections N' and N'', and leaves the tower by line 411 with its acid gas content reduced to a relatively low level. Condenser 412 is provided through which the gas stream passes, leaving the condenser by line 413, while condensate is refluxed to the top of tower 400 by line 414.

In the system shown, solution in zone M is heated above its atmospheric boiling temperature by contact with the hot, saturated gas entering the bottom of the tower, and by the heat liberated by the absorption of the gas. The gas is, at the same time, cooled approximately to the temperature of the solution entering by line 401 at the top of zone M. In zone N, the cooler gas stream contacts cooler solution in packed section N' (where it is contacted with a mixture of the cooled solution entering by line 404 and the hotter solution entering by line 405). In packed section N'', the gas contacts still cooler solution and leaves the top of the tower typically at a temperature approximating the temperature of the solution entering by line 404.

Regeneration is carried out in a regeneration tower generally indicated by the reference numeral 415, consisting of a higher temperature, higher pressure regeneration zone O, provided with a lower packed section O', and an upper packed section O'', and a lower temperature, lower pressure regeneration zone P containing a packed section P'. The higher pressure zone O is separated from the lower pressure zone P by a dome 416 which prevents communication between the two zones.

The higher pressure zone O is supplied with stripping steam by reboiler 417 through which scrubbing solution circulates from sump 418 at the bottom of zone O through lines 419 and 420. Steam raised in reboiler 417 is introduced into the bottom of zone O by line 421.

Lower pressure zone P is supplied with stripping steam from two sources, one of which is reboiler 422 through which solution from sump 423 at the bottom of zone P circulates through lines 424 and 425. Steam raised in reboiler 422 is introduced into the bottom of regeneration zone P by line 426. Steam is also supplied to lower pressure regeneration zone P by line 427 as will be described in more detail below.

Reboiler 417 is equipped with a heating coil 417a through which a hot, saturated process gas is passed from line 466. After leaving reboiler 417, the process gas is conducted by line 467 to reboiler 422 where it is passed through heating coil 422a and is then conducted by lines 468 and 409 to the bottom of the absorber tower.

The mixture of steam and acid gas collecting at the top of zone O is conducted by line 428 to a condenser 429, the condensate refluxing back into zone O through line 430. The gaseous effluent from the condenser, consisting mostly of acid gas, leaves by line 431.

The mixture of steam and acid gas collecting at the top of zone P is removed by line 432 and conducted to a condenser 433, condensate refluxing back into zone P through line 434. The gaseous effluent from the condenser, consisting mostly of acid gas, leaves by line 435.

Regeneration of the solution in zone O takes place in two stages. Hot, spent solution leaving absorption zone M above its atmospheric boiling temperature by line 403, after passing through pressure letdown valve 436, is conducted by line 437 to the top of zone O operating at a moderate superatmospheric pressure. The spent solution first contacts stripping steam in packed section O'' generated at the bottom of zone O by reboiler 417. The stripping steam generated by reboiler 417 first contacts solution in packed section O' and then the steam-acid gas mixture passes up through chimney 438 in collecting plate 439. Chimney 438 is provided with a deflector cap 440 to prevent solution flowing down through packed section O'' from entering packed section O' through chimney 438.

The solution collecting on collector plate 439 is divided into two streams, one of which is withdrawn from collector plate 439 by line 441 and the other of which overflows collector plate 439 through downcomers 442. The flow ratio between the streams of solution flowing through line 441 and overflowing downcomers 442 may be controlled in conventional fashion, e.g. by a flow controller on line 441, responsive e.g. to the liquid level in sump 418 at the bottom of zone O, or by some other conventional means.

In regeneration zone O, accordingly, the entire solution is subjected to moderate regeneration by contact with stripping steam in packed section O'' while a portion of the scurbbing solution is subjected to more thorough regeneration by contact with additional stripping steam in packed section O'. The moderately regenerated solution leaves zone O by line 441 while the more thoroughly regenerated solution (also at a somewhat higher temperature) leaves the bottom of zone O by line 443.

The more thoroughly regenerated stream of solution leaving by line 443 passes through pressure letdown valve 444 and into flash tank 445 operating at or slightly above atmospheric pressure. On the reduction of the pressure on the solution from zone O to approximately atmospheric pressure, essentially pure steam is evolved from flash tank 445 and is fed by line 446 to the bottom of regeneration zone P by line 427 where it serves as effective stripping steam. The scrubbing solution collecting at the bottom of flash tank 445 in sump 447, cooled by the endothermic release of steam, is conducted by line 448, recycle pump 449, line 450, cooler 451, and line 404 to the top of absorption zone N.

The moderately regenerated solution leaving zone O by line 441, after passing through pressure letdown valve 452, is conducted by line 453 to flash tank 454 where its pressure is reduced from that prevailing in zone O to approximately atmospheric pressure. As a result of the pressure reduction, steam is evolved which is conducted by line 455 to line 446 where it joins steam from flash tank 445 and is introduced by line 427 into the bottom of regeneration zone P where it serves as effective stripping steam. The cooled solution collecting in sump 456 at the bottom of tank 454 is conducted by line 457, recycle pump 458, and line 401 to the top of absorption zone M.

Regeneration zone P at approximately atmospheric pressure serves to regenerate solution from lower temperature absorption zone N. Solution leaving the bottom of zone N by line 408, after passing through pressure letdown valve 459, is conducted by line 460 to the top of zone P. Upon reduction of pressure, a portion of the $CO_2$ flashes off and the mixture of steam and $CO_2$ leaves the top of the tower by line 432. The solution then travels down through packed section P' where it contacts stripping steam fed into the bottom of zone P by lines 426 and 427. Regenerated solution collecting in sump 423 at the bottom of regeneration zone P is removed by line 461 and recirculated by recycle pump 462, flow control valve 463, and lines 405 and 464 to the absorption zones.

In operation of the system of FIG. 4 (or in the operation of similar systems such as those of FIGS. 4a, 5 and 6), the cooled, more thoroughly regenerated solution entering the top of the absorber will generally be a minor proportion (e.g. of the order of 15% to 40%) of the total solution circulating in all zones of the absorber tower, and will generally be from 40% to 60% of the total solution circulated in the top zone. In most cases, particularly when using potassium carbonate scrubbing solutions, with or without additives, the stream entering the top of the absorber will be cooled to a temperature of from about 50° C. to 90° C., and most usually to a temperature of from 60° C. to 80° C.

It will be noted that in the system of FIG. 4 there is a cross-over of solution from the bottom of the higher pressure regeneration zone O (via line 443, valve 444, flash tank 445, line 448, pump 449, cooler 451, and line 404) to the top of lower temperature absorption zone N. Because of this cross-over, there must be a corresponding cross-over of regenerated solution from lower pressure regeneration zone P to higher temperature absorption zone M (via line 461, pump 462, valve 463, and lines 464 and 401). For example, if 25% of the total solution flow in the system is fed into the top of zone N through line 404, then a corresponding 25% must be returned to the top of zone M through line 464. Accordingly, the ratio of flows in lines 405 and 464, as controlled by valve 463, will be such that the solution flow in line 464 matches that in line 404.

In typical applications, the scrubbing solution leaving the bottom of flash tank 454 by line 457 will be approximately at the same composition and same temperature as that leaving regeneration zone P by line 461. Thus, when the two solutions are mixed at point 465 in lie 401, there will be little or no change in the temperature or composition of the combined stream.

In the system of FIG. 4, thermal efficiency is optimized and capital cost is minimized by utilizing the higher temperature, higher pressure regeneration zone to regenerate the more thoroughly regenerated stream of solution introduced into the top of absorption zone N. Thermal efficiency is enhanced because the regeneration of the solution to higher regeneration levels takes place more readily at the higher pressure and correspondingly higher temperature prevailing in higher pressure regeneration zone O. Capital cost is minimized since the amount of packing required for regeneration is decreased in packed section O' where the solution is more thoroughly regennecessary only to point out the differences between the

EXAMPLE 4

The operation of the system of FIG. 4 may be illustrated in connection with the following typical example. A hot, saturated gas stream derived from the pressure reforming and water-gas shift of natural gas intended for ammonia synthesis and containing 18% $CO_2$, 61.3% hydrogen, 20.2% nitrogen, 0.3% CO, and 0.2% $CH_4$, at a temperature of 169° C., saturated with water vapor and at a pressure of 373 p.s.i.g. is introduced into the system by line 466, passes through reboiler 417 and leaves at a temperature of 140° C. The process gas enters reboiler 422 at a temperature of 140° C., and at a pressure of 371 p.s.i.g., leaving reboiler 422 at a temperature of 131° C.

The process gas at a temperature of 131° C., saturated with water vapor and containing 18% $CO_2$ ($CO_2$ partial pressure of 64 p.s.i.g.) is fed into the bottom of absorption tower 400 at a flow rate of 16,800 pound mols per hour (lb. mols/hr.) of dry gas plus 2,000 lb. mols/hr. of water vapor. Regenerated scrubbing solution at a circulation rate of 161,500 gallons per hour is introduced into the top of zone M by line 401 at a temperature of 109° C. The scrubbing solution is a 30% by weight potassium carbonate solution containing 3% by weight of diethanolamine.

The solution leaves the bottom of absorption zone M by line 403 at a temperature of 127° C., having been heated to this temperature by the combined heat of absorption of $CO_2$ and the heat transferred to the solution from the hot, saturated gas.

The gas, now cooled to a temperature of about 109° C. and containing 10% $CO_2$ ($CO_2$ partial pressure equals 37 lbs./in.$^2$), passes up through chimney 410 and contacts scrubbing solution in packed sections N' and N''. A 30% by weight $K_2CO_3$ solution containing 3% diethanolamine, in a more thoroughly regenerated condition, is fed into the top of zone N above packed section N'' by line 404 at a rate of 79,600 gallons per hour at a temperature of 70° C. Solution of the same composition but in a moderately regenerated condition is introduced by line 405 at a rate of 77,300 gallons per hour at a temperature of 108° C. The solution from section N'' mixes with solution introduced by line 405 above section N', and the mixed solutions are withdrawn from the bottom of zone N by line 408 at a temperature of 107° C. and at a rate of 156,900 gallons per hour. The solution temperature leaving the bottom of packed section N'' is 79° C. whereas the temperature of the mixed solutions at the top of packed section N' is 96° C.

The purified gas leaves the top of the absorber tower by line 411 at a temperature of 70° C. containing 0.1% $CO_2$.

The highly spent solution leaving the bottom of higher temperature zone M at a temperature of 127° C. is passed at the rate of 161,500 gallons per hour to the top of regeneration zone O by line 437 after passing through pressure letdown valve 436. The pressure at the top of regeneration zone O is maintained at 16 p.s.i.g. Upon exposure to the reduced pressure in zone O, the solution flashes off some steam and $CO_2$ and cools, after which it is passed through packed section O'' and is subjected to steam stripping. Because of the pressure drop through the packed sections O'' and O', the pressure just below packed section O'' is about 18 p.s.i.g. while the pressure just below packed section O' is 19 p.s.i.g.

A portion of the solution introduced into regeneration zone O by line 437, after having been subjected to a moderate degree of regeneration in packed section O'', is removed from the collecting plate 439 by line 441 at a temperature of 125° C. and a flow rate of approximately 81,900 gallons per hour. After passing through pressure letdown valve 452, the solution is conducted to flash tank 454 operated at a pressure of 5 p.s.i.g. Steam is evolved at the rate of 20,100 lbs./hr. which passes out through line 455 and the solution is cooled to a temperature of 109° C. and recirculated to the top of absorption zone M.

Another portion of the regenerated solution in zone O overflows collector plate 439 through downcomers part of the solution is regenerated to a moderate degree while a minor portion is more thoroughly regenerated, cooled, and supplied to the top of the absorber tower. The results of such a comparison are shown in the table below.

|  | Single absorption and regeneration zones | Example 4 | Percent change |
|---|---|---|---|
| Net regeneration efficiency: (cu. ft. of CO₂ removed per lb. of steam consumed). | 7.92 | 11.65 | 32.1% higher regeneration efficiency. |
| Total reboiler duty (B.t.u./hr.) | 130,000,000 | 88,200,000 | 32.1% decrease in outside steam requirements. |
| Overhead condenser cooling duty (B.t.u./hr.) | 124,000,000 | 99,200,000 | 20.0% decrease in overhead condenser duty. |
| Total scrubbing solution flow rate (gal./hr.) | 328,000 | 318,000 | 3.1% decrease in solution circulation rate. |

442 and passes through packed section O' at the rate of about 79,600 gallons per hour. This stream of solution collecting in sump 418 is conducted by line 443 and pressure letdown valve 444 to flash tank 445 maintained at a pressure of 5 p.s.i.g. The steam generated at the rate of 23,200 lbs./hr. leaves by line 446. The solution, cooled to a temperature of 112° C., is circulated through cooler 451 where it is further cooled to 70° C. and is then fed into the top of absorption zone N, entering by line 404.

Regeneration zone P is maintained at a pressure of 2 p.s.i.g. at the top of the tower. Due to the slight pressure drop through packing P', the pressure just below packed section P' is about 4 p.s.i.g. Solution leaving the bottom of absorption zone N at 107° C., after passing through pressure letdown valve 459, is introduced by line 460 into the top of zone P where a portion of the CO₂, together with steam, flashes off from the solution. The solution then passes down through regeneration zone P in contact with stripping steam fed into the bottom of zone P by lines 426 and 427. The solution collecting in sump 423 at the bottom of zone P is conducted by line 461 and recycle pump 462 to flow control valve 463 where the solution is split into the two streams, one passing through line 405 at a flow rate of 77,300 gallons per hour, and the other passing through line 464 at a flow rate of 79,600 gallons per hour.

The mixture of steam and CO₂ collecting at the top of regeneration zone O passes by line 428 at a flow rate of 2,990 lb. mols/hr. of water vapor and 1,760 lb. mols of CO₂ into condenser 429 where 2,940 lb. mols of water are condensed and returned to the top of regeneration zone O; 1,760 lb. mols of CO₂ and 50 lb. mols of water vapor leave at a temperature of 38° C. and a pressure of 15 p.s.i.g. from condenser 429 by line 431

A mixture of steam and CO₂ at the rate of 1,250 lb. mols/hr. of CO₂ and 1,845 lb. mols/hr. of water vapor is removed from the top of zone P and conducted to condenser 433 from which 1,760 lb. mols/hr. of condensate is refluxed into the top of zone P. The effluent from the condenser leaving by line 435 is a mixture of 1,250 lb. mols/hr. of CO₂ and 84 lb. mols/hr. of water vapor at a temperature of 38° C., and a pressure of one p.s.i.g.

The outstanding advantages of the system of the invention can be appreciated by a comparison of the results obtained in Example 4 above with the results obtained in a prior system utilizing the same feed gas, the same scrubbing solution, and producing a purified gas of the same purity, but in which only one absorption zone is employed and in which only one regeneration zone is employed operating at atmospheric pressure. In the prior system, as in Example 4, the absorber tower is supplied with regenerated solution at two points, viz. with cool (70° C.), more thoroughly regenerated solution which enters the top of the tower, and with hotter (108° C.), moderately regenerated solution which enters at an intermediate point. In the prior system, as in Example 4, In addition to the above, the system of FIG. 4 in contrast to prior practice, provides a 24% savings in the total amount of packing in the regeneration zone, and a 16.7% decrease in the amount of packing required in the absorber. The total percent reduction in equipment cost for the plant, including the smaller reboiler, the smaller overhead condensers which generally must be constructed of stainless steel, and the savings in packing results in savings in the capital cost of the plant of the order of 15%.

It will be noted in Example 4 that the pressure at the top of the lower pressure regeneration zone P is substantially atmospheric pressure such that the pressure at the bottom of zone P is only slightly increased due to the pressure drop through packing P'. This manner of operation, which provides the maximum pressure differential between the lower pressure and the higher pressure regeneration zone is preferred from the standpoint of maximum thermal efficiency since, in this way, the maximum amount of useful stripping steam can be generated in flashing tanks 445 and 454. The higher the pressure at the bottom of the lower pressure regeneration zone, the higher the pressure that is required in the flashing tanks to provide the required pressure head to drive the steam from the flash tanks into the bottom of the lower pressure regeneration zone. Steam ejectors or mechanical compressors could, of course, be used to drive the steam from the flash tanks into the bottom of the lower pressure regeneration zone, but these alternatives require additional equipment and are less efficient than the arrangement wherein the steam generated in the flash tanks travels into the lower pressure regeneration zone under its own head.

Frequently, however, the CO₂ recovered from the regenerator is to be used under superatmospheric pressures such as in the synthesis of urea by the reaction of CO₂ and ammonia. In such cases, it is necessary that the CO₂ leaving the scrubbing plant be delivered to the urea synthesis at elevated pressures. The delivery of all the CO₂ at a superatmospheric pressure may be accomplished without reducing the efficiency of the system of the invention by following the procedures illustrated in FIG. 9 of the drawings.

Reference is now made to FIG. 9, which shows only the regeneration portion of the system of FIG. 4. The reference numeral 415 refers to a regeneration tower similar in all respects to that shown in FIG. 4 provided with a higher pressure, higher temperature regeneration zone O provided with packed sections O' and O'', and a lower pressure, lower temperature regeneration zone P provided with a packed section P'. For clarity, portions of the system of FIG. 4, such as the reboilers and flash tanks, have been omitted. As in FIG. 4, the mixture of steam and gas collecting in zone P is conducted to a condenser 433 by line 432, condensate being refluxed to zone P by line 434. Similarly, the mixture of steam and CO₂ collecting at the top of higher pressure regeneration zone O is led by line 428 to a condenser 429, condensate being refluxed back to zone O by line 430.

The higher pressure stream of acid gas leaving condenser 429 by line 431 is conducted to a nozzle 900 extending into the throat of ejector 901. The atmospheric pressure stream of acid gas leaving the top of condenser 433 by line 435 is conducted to the lower pressure end 902 of ejector 901. The high-velocity stream issuing from nozzle 900 at a pressure of e.g. 15 p.s.i.g. compresses the atmospheric pressure stream of acid gas to an intermediate pressure, and the combined, intermediate pressure stream leaves the high pressure end of the ejector 901 by line 903.

If, for example, the procedure of FIG. 9 is applied to the overhead condenser effluents in Example 4, the following results may be obtained. The effluent leaving condenser 433 by lines 435, consising of a stream of 1,250 lb. mols/hr. of $CO_2$ and 84 lb. mols/hr. of $H_2O$ at a temperature of 38° C. and one p.s.i.g., is fed into the low pressure end of the ejector while the effluent stream leaving condenser 429 by line 431, consisting of a stream of 1,760 lb. mols/hr. of $CO_2$ and 49 lb. mols/hr. of $H_2O$ at a temperature of 38° C. and a pressure of 15 p.s.i.g., is fed through the nozzle of the ejector to produce a combined stream of 3,010 lb. mols/hr. of $CO_2$ at an intermediate pressure of 6 p.s.i.g. Thus, the single combined stream of compressed $CO_2$ is available for further compression to the higher pressures required for a urea plant.

In some cases, only a portion of the $CO_2$ removed in a scrubbing unit is required for a urea plant. Thus, the amount of $CO_2$ at the higher pressure of e.g. 15 p.s.i.g. may be sent to the urea plant, thereby saving appreciable horsepower for compression.

If desired, the system of FIG. 4 may be modified to eliminate the need for flashing tank 454 and pump 458. This may be accomplished by conducting the moderately regenerated scrubbing solution leaving regeneration zone O by line 441 directly to the bottom of regeneration zone P (after passing through pressure let-down valve 452). On entering lower pressure regeneration zone P, steam will flash off from the solution (equivalent to the amount of steam released in flashing tank 454) which will serve as stripping steam in zone P. The flashed solution will mix in sump 423 with solution fed into the top of zone P by line 460. Typically, the solution on collecting tray 439 of zone O and that collecting in sump 423 after stripping in zone P will have been regenerated to approximately the same degree and accordingly the mixture of solutions will have a degree of regeneration quite close to the solutions before mixing.

The mixed solution in sump 423 is pumped by recycle pump 462 to flow control valve 463 where it is split between line 405 and line 464. In this embodiment, the flow through line 464 and line 401 into the top of zone M will be equal to the flow through line 457 plus the flow through line 448 in order to balance solution flows in the system.

Reference is now made to FIG. 4a illustrating a system similar to that of FIG. 4, but somewhat simpler in design and providing lower plant cost. All elements in FIG. 4a which are equivalent to those in FIG. 4 have been given the same reference numeral or reference letter and, accordingly, it will only be necessary to refer to the differences between the system of FIG. 4 and the system of FIG. 4a.

One of the principal differences between the system of FIGS. 4 and 4a is that in the system of FIG. 4a all of the scrubbing solution which is fed to the higher pressure, higher temperature regeneration zone O by line 437 is subjected to a relatively high degree of regeneration in packed section O', whereas in the system of FIG. 4 a portion of the solution is subjected to a moderate degree of regeneration in packed section O'' and a second portion subjected to more thorough regeneration in packed section O'. This has the advantage of reducing the circulation rate of the solution in the system by increasing the absorption capacity of the solution. At the same time, the equipment is simplified since only one flashing tank 445 is required.

In the system of FIG. 4a, thoroughly regenerated solution (for example, having a potassium bicarbonate fraction of 30%) leaving the bottom of higher pressure regeneration zone O by line 443, after passing through pressure letdown valve 444, flashing tank 445, sump 447, line 448, pump 449, and line 450, is split into two streams by flow control valve 470, one stream flowing by line 471, cooler 451 and line 404 to the top section of lower temperature absorption zone N, and the other portion flowing by line 472 and line 401 to the top of higher temperature absorption zone M.

The proportion of cooled, thoroughly regenerated solution fed to the top of lower temperature regeneration zone N will usually be about 15% to 40% of the total solution circulating in all zones of the absorber tower, as explained in connection with FIG. 4.

Since a portion of the solution from higher temperature regeneration zone O is fed to lower temperature absorption zone N, it becomes necessary, of course, to feed a corresponding portion of scrubbing solution from lower temperature regeneration zone P to the higher temperature absorption zone M. In the system of FIG. 4a, the moderately regenerated solution leaving lower temperature regeneration zone P by line 461 is fed by recycle pump 462 to flow control valve 463 where it is split into two portions, one portion flowing by line 405 to the top of section N' of absorption zone N and a second portion flowing by line 464 and line 401 to the top of absorption zone M. In order to keep the system in balance, the rate of flow of solution in line 471 should be equal to the rate of flow in line 464.

In typical applications of the system of FIG. 4a, the regenerated solution from lower temperature regeneration zone P will be less thoroughly regenerated than the solution leaving higher temperature regeneration zone O. Thus, when the two regenerated solutions are blended at point 473 in line 401, a solution having an intermediate degree of regeneration will result.

Another significant difference between the systems of FIGS. 4 and 4a is in the arrangement of the reboilers which provide stripping steam for regeneration zones O and P. In FIG. 4, stripping steam for both zones O and P is raised by heating the scrubbing solution in reboilers 417 and 422.

In FIG. 4a, on the other hand, stripping steam for regeneration zone O is raised in reboiler 417 by heating scrubbing solution, whereas stripping steam for regeneration zone P is raised by heating aqueous condensate produced in the system. Thus, regeneration zone P is provided with a condensate-fed reboiler 474. The supply of aqueous condensate to reboiler 474 may be derived from either or both of overhead condensers 429 and 433. Condensate is removed from condenser 433 by line 434 and is passed through flow control valve 475 which splits the flow between line 476 (which returns a portion of the condensate to the top of regeneration zone P) and line 477 (which feeds a portion of the condensate to reboiler 474). Similarly, condensate leaving reboiler 429 by line 430 may be split into two portions by flow control valve 478 which splits the flow between line 479 (which feeds a portion of the condensate to the top of regeneration zone O) and line 480 (which feeds a portion of the condensate to reboiler 474). The relative amounts of condensate supplied to reboiler 474 from condensers 429 and 433 will, of course, be determined by the overall water balance in the system. Steam raised in condensate reboiler 474 is fed by line 481 to regeneration zone P. Condensate-fed reboiler 474 is provided with a heating coil 474a through which hot, saturated process gas is passed from line 467, after having a given up a portion of its heat in reboiler 417.

In the system of FIG. 4a, accordingly, lower pressure regeneration zone P is supplied with steam partly from condensate reboiler 474 and partly by steam generated in flashing tank 445 which enters the bottom of regeneration zone P by line 446.

It will often be advantageous to employ a condensate reboiler for the lower pressure regeneration zone P as shown in FIG. 4a, particularly when the lower pressure regeneration zone is arranged in the upper portion of the regeneration tower as illustrated. When using a condensate reboiler, the reboiler may be located at ground level since only a relatively small volume of condensate feed is involved. Where steam is raised by heating the scrubbing solution, on the other hand, large volumes of solution must be circulated and the reboiler must normally be elevated to approximately the same level as the sump from which the solution is supplied (in the case of regeneration zone P, sump 423) in order to avoid transferring large volumes of solution over long distances.

EXAMPLE 4a

The operation of the system of FIG. 4a may be illustrated in connection with the following typical example. A hot, saturated gas stream derived from the pressure-reforming and water-gas shift of natural gas, and intended for ammonia synthesis, and containing 17.6% $CO_2$ with the remainder mostly hydrogen and nitrogen in a 3:1 molar ratio, enters reboiler 417 by line 466 at a temperature of 169.5° C. and leaves at a temperature of 142° C. The process gas then flows by line 467 to condensate-fed reboiler 474, entering at a temperature of 142° C. and leaving at a temperature of 126° C.

The process gas at a temperature of 126° C., saturated with water vapor and containing 17.6% $CO_2$ and at a pressure of 410 p.s.i.g., is fed into the bottom of absorption tower 400 at a flow rate of 13,400 lb. mols/hr. of dry gas. Regenerated solution at a circlation rate of 117,500 gallons per hour is introduced into the top of zone M by line 401 at a temperature of 1009° C. The scrubbing solution is a 30% by weight potassium carbonate solution containing 3% by weight of diethanolamine.

The solution leaves the bottom of regeneration zone M by line 403 at a temperature of 125° C., having been heated to this temperature by the combined heat of absorption of $CO_2$ and the heat transferred to the solution from the hot, saturated gas.

The gas, now cooled to a temperature of about 109° C. and containing 10% $CO_2$, passes up through chimney 410 and contacts scrubbing solution in packed sections N and N'. A 30% $K_2CO_3$ solution containing 3% diethanolamine having a potassium carbonate fraction of 30% is fed into the top of zone N above packed section N" by line 404 at a rate of 63,200 gallons per hour at a temperature of 70° C. Solution of the same composition but having a potassium carbonate fraction of 47% is introduced by line 405 at a rate of 72,300 gallons per hour at a temperature of 105° C. The solution from section N" mixes with solution introduced by line 405 above section N' and the mixed solutions are withdrawn from the bottom of zone N by line 408 at a temperature of 102° C. and at a rate of 135,500 gallons per hour. The solution temperature leaving the bottom of packed section N" is 78° C. whereas the temperature of the mixed solutions at the top of packed section N' is 92° C.

The purified gas leaves the top of the absorber tower by line 411 at a temperature of about 70° C. containing 0.1% $CO_2$.

The spent solution leaving the bottom of higher temperature absorption zone M by line 403 at a temperature of 125° C. is passed to the top of regeneration zone O by line 437 after passing through pressure letdown valve 436. The pressure at the top of regeneration zone O is maintained at 16 p.s.i.g. Upon exposure to the reduced pressure in zone O, the solution flashes off some steam and $CO_2$ and cools, after which it is passed through packed section O' and subjected to steam stripping. Because of the pressure drop through packed section O', the pressure at the bottom of regeneration zone O is 18 p.s.i.g.

The solution collecting at the bottom of zone O in sump 418, having a potassium bicarbonate fraction of 30%, is conducted by line 443 and pressure letdown valve 444 to flash tank 445 maintained at a pressure of 6 p.s.i.g. The steam generated at the rate of 26,900 lbs./hr., leaves by line 446 and is fed into the bottom of lower pressure regeneration zone P as stripping steam. The solution, cooled to a temperature of 113° C., is recirculated by pump 449 and line 450 to flow control valve 470 where it is split into two streams, one of which is fed through line 471 at the rate of 63,200 gallons per hour, to cooler 451 where it is cooled to 70° C. and then introduced by line 404 into the top of absorption zone N, and the other fed by line 472 at the rate of 54,300 gallons per hour and then fed into the top of absorption zone M by line 401.

Regeneration zone P is maintained at a pressure of 3 p.s.i.g. at the top of the tower, with a pressure of about 4 p.s.i.g. at the bottom due to the slight pressure drop through packing P'. Solution leaving the bottom of absorption zone N at 102° C., after passing through pressure letdown valve 459, is introduced by line 460 into the top of zone P where a portion of the $CO_2$ together with steam flashes off from the solution. The solution then passes down through regeneration zone P in contact with stripping steam fed into the bottom of zone P by lines 481 and 446. The solution collecting in sump 423 at the bottom of zone P is conducted by line 461 and recycle pump 462 to flow control valve 463 where the solution is split into two streams, one passing through line 405 at a flow rate of 72,300 gallons per hour and the other passing through line 464 at the rate of 63,200 gallons per hour. The solution in line 464, having a potassium carbonate fraction of 47%, mixes at point 473 with more thoroughly regenerated solution flowing from line 472 having a potassium carbonate fraction of 30%. After mixing, the solution flowing by line 401 into the top of absorption zone M has an intermediate bicarbonate fraction of about 39%.

The savings in regeneration steam, reboiler duty, and overhead condenser duty obtained in Example 4a, as compared to a system using a single absorption and regeneration zone, are similar to those obtained in Example 4 as shown by the following table. The savings in solution circulation rate (9.6%) are considerably greater as a result of the regeneration of a higher proportion of the solution to a relatively low bicarbonate fraction.

|  | Single absorption and regeneration zones | Example 4 | Percent change |
|---|---|---|---|
| Net regeneration efficiency: (cu. ft. of $CO_2$ removed per lb. of steam consumed). | 7.53 | 11.2 | 32.6% higher regeneration efficiency. |
| Total reboiler duty (B.t.u./hr.) | 106,000,000 | 71,400,000 | 32.6% decrease in outside steam requirements. |
| Overhead condenser cooling duty (B.t.u./hr.) | 83,000,000 | 68,000,000 | 18% decrease in overhead condenser duty. |
| Total scrubbing solution flow rate (gal./hr.) | 280,000 | 253,000 | 9.6% decrease in solution circulation rate. |

Reference is now made to FIG. 5 which also shows a system similar to that of FIG. 4. All elements in FIG. 5 which are equivalent to those shown in FIG. 4 have been given the same reference numeral or reference letter and, accordingly, it will only be necessary to refer to the differences between the system of FIG. 4 and the system of FIG. 5. It will be noted that, in both systems, the more thoroughly regenerated stream of solution, which is cooled in cooler 451 and fed to the top of the absorber by line 404, is subject to more thorough regeneration in the higher pressure zone O of the regenerator.

However, whereas in FIG. 4 the entire feed to regeneration zone O is through line 437 from the bottom of the absorption tower, in FIG. 5 there are two feed streams to regeneration zone O, namely a first feed stream to the top of packed section O' entering by line 437, and a second stream fed to the top of packed section O' by line 510 which draws from solution in sump 423 at the bottom of lower pressure regeneration zone P. Solution leaving sump 423 passes through a proportional flow valve 511 which divides the flow between lines 461 and 510. The amount of flow through line 510 is that required to supply a stream of more thoroughly regenerated solution to the top of the absorber column 400 through line 404.

Although regeneration zone O is at a higher pressure than regeneration zone P, e.g. 20 p.s.i.g. higher, where regeneration zone P is arranged at the top of the regeneration tower 415, there will often be sufficient hydrostatic head between sump 423 and the bottom portion of the regeneration tower to obviate the need for a pump to force solution from the lower pressure zone P through line 510 to higher pressure zone O.

It will be noted also in FIG. 5 that the moderately regenerated solution collecting in sump 512 at the bottom of packed section O'' does not overflow collection plate 439. All of the solution from sump 512 is recycled to the top portion of absorption zone M by way of line 441, valve 452, line 453, flash tank 454, line 457, recycle pump 458, and line 401.

Finally, in FIG. 5 it will be noted that the condensate leaving condenser 429 by line 430 may be split into two streams, one flowing into zone O by line 514 above packed section O'' and the other flowing into zone O by line 513 above packed section O'. The ratio of flows in line 513 and line 514 will depend on the water balance in the system.

In most cases, the system of FIG. 5 will be somewhat less advantageous than that of FIG. 4 since the solution fed into the bottom section of higher pressure regeneration zone O is at a lower temperature than that prevailing in regeneration zone O, and must be heated to the temperature of regeneration zone O by stripping steam supplied by reboiler 417. This imposes an additional load on the reboiler, although the heat transferred to the solution in packed section O' is released as stripping steam when the solution is flashed in flash tank 445.

Reference is now made to FIG. 6 of the drawings which also shows a system similar to that of FIG. 4. Here again, all elements in FIG. 6 equivalent to those in FIG. 4 have been given the same reference numerals, and it will be necessary only to point out the differences between the systems of FIG. 4 and FIG. 6.

The principal difference is that the minor, more thoroughly regenerated portion of the solution which is fed to the top of absorption zone N by line 404 is regenerated in the lower pressure, lower temperature regeneration zone P. For this purpose, zone P has two packed sections, an upper packed section P'', and a lower packed section P'. In upper packed section P'', the solution from absorption zone N is subjected to a moderate degree of regeneration. The moderately regenerated solution collects in sump 600 at the bottom of packed section P'' on collecting plate 601. Collecting plate 601 is provided with a chimney 602 through which stripping steam from the bottom portion of zone P passes upwardly into the top portion of zone P. A deflector cap 603 is provided to prevent solution from passing downwardly through the chimney. Collector plate 601 is also provided with downcomers 604. A portion of the solution collecting on plate 601 is withdrawn from sump 600 by line 605 and recycled by recycle pump 606 and line 405 to absorption zone N just above packed section N'. Another portion of the moderately regenerated solution overflows through downcomer 604 and then passes down through packed section P' where it contacts stripping steam introduced into the tower from reboiler 422 by line 426.

More thoroughly regenerated solution which has been subjected to extra steam stripping collects at the bottom of zone P in sump 607 and is withdrawn by line 608 and recycle pump 609, cooler 610 and line 404 to the top of the lower temperature absorption zone N.

It will be noted in FIG. 6 that only one flash tank 445 is employed which feeds flashed steam to lower pressure regeneration zone P through line 446, the steam entering just below packed section P'', where it serves as effective stripping steam for that portion of the solution passing downwardly through packed section P''.

The system in FIG. 6 has the advantage, as compared to that of FIG. 4, of eliminating one of the flash tanks, and also of eliminating the cross-over of solution from the lower temperature to the higher temperature part of the system. It will be noted in FIG. 6 that lower pressure, lower temperature regeneration zone P serves to regenerate all of the solution flowing through lower temperature absorption zone N, while higher pressure, higher temperature regeneration zone O serves to regenerate all of the solution flowing through higher temperature absorption zone M, there being no cross-over of solution between the higher and lower temperature portions of the system. FIG. 6 has the disadvantage, as compared to the system of FIG. 4, that more packing (or other equivalent gas-liquid contact means) will be required in packed section P' of regeneration zone P because of the lower regeneration pressure, and correspondingly lower regeneration temperature prevailing in zone P.

Reference is now made to FIG. 7 which shows an embodiment of the invention particularly adapted for the treatment of gas mixtures in which the partial pressure of acid gas is quite high, for example 150 pounds per square inch or higher. The system of FIG. 7 employs an absorber tower having three separate zones, and is adapted for the treatment of a cool feed gas such as a natural gas stream containing high partial pressures of $CO_2$ and/or $H_2S$. The absorber tower 700, adapted to operate at substantial superatmospheric pressures, is provided with a separate lower temperature absorption zone Q provided with a section Q' equipped with packing or other means for insuring intimate gas-liquid contact. Zone Q is separately supplied with regenerated scrubbing solution by line 701, while spent scrubbing solution collects in sump 702 at the bottom of zone Q and is separately withdrawn from the absorber tower by line 703.

Two higher temperature absorption zones, generally designated by the letters R and S, are arranged above zone Q. zone R being provided with a packed section R', and zone S being provided with a packed section S'. Zone R is separately supplied with regenerated scrubbing solution by line 704 which flows down over packed section R', collects on collecting plate 705, and is separately withdrawn from the bottom of zone R by line 706.

Zone S is separately supplied with regenerated scrubbing solution by line 707 which flows down over packed section S' and collects at the bottom of zone S on collecting plate 708, and is separately withdrawn from zone S by line 709.

The gas stream introduced into the bottom of the tower by line 710 flows upwardly in series through the tower in successive contact with the scrubbing solution in zones Q, R, and S. The gas passes from zone Q to zone R through chimney 711 provided in collector plate 705, deflector cap 712 being provided to prevent the passage of scrubbing solution from zone R to zone Q. The gas mixture passes from zone R to zone S through chimney 713 provided in collector plate 708, deflector cap 714 being provided to prevent liquid from passing from zone S to zone R. The purified gas mixture passes out of the absorption tower by line 715, passes through condenser 716, and leaves the system by line 717. Aqueous condensate is refluxed back into the absorber by line 718.

Regeneration of the scrubbing solution occurs in regeneration tower generally designated by the reference numeral 719, consisting of a higher pressure, higher temperature zone T provided with a packed section T', and a lower pressure, lower temperature zone U provided with a packed section U'. Dome 720 separates the higher temperature zone T from lower pressure zone U, preventing communication between the two zones.

Stripping steam for higher pressure zone T is provided by reboiler 721 through which solution from sump 722 circulates by lines 723 and 724. The reboiler is provided with a steam coil 725. Steam raised in the reboiler is fed to the bottom of zone T by line 726.

Lower pressure zone U is supplied with a portion of its stripping steam requirements by reboiler 727 through which scrubbing solution from sump 728 circulates through lines 729 and 730 in contact with steam coil 731. Steam raised in the reboiler is fed into the bottom of zone U by line 732. A substantial portion of the stripping steam requirements of zone U is provided by that produced in flash tank 750 which is fed into zone U by line 751 as will be described in more detail hereafter.

The mixture of steam and acid gas collecting at the top of zone U is conducted by line 733 to condenser 734, aqueous condensate being reffuxed back into the top of zone U by line 735. The gaseous condenser effluent, consisting mostly of acid gas, leaves by line 736.

The mixture of steam and acid gas collecting at the top of zone T is withdrawn by line 737, passed through condenser 738, the aqueous condensate being refluxed back into zone T by line 739. The gaseous effluent from condenser 738, consisting mostly of acid gas, leaves by line 740.

The spent scrubbing solution leaving lower temperature absorption zone Q by line 703, after passing through pressure letdown valve 741, is conducted by line 742 to the top of lower pressure regeneration zone U. A mixture of steam and $CO_2$ flashes off from the solution upon reduction of the pressure on the solution to substantially atmospheric pressure in zone U. The solution then flows down over packed section U' and is subjected to steam stripping, and the regenerated solution collects in sump 728 at the bottom of zone U. The regenerated solution from zone U is withdrawn by line 743 and recirculated preferably without cooling to the top of lower temperature absorption zone Q by recycle pump 744 and line 701.

Spent scrubbing solution from higher temperature absorption zones R and S is withdrawn from these zones by lines 706 and 709, respectively. The two streams of spent scrubbing solution are combined in line 745 and, after passing through pressure letdown valve 746, is introduced into the top of higher pressure regeneration zone T by line 747. The scrubbing solution passes downwardly over packed section T', and the regenerated solution collects at the bottom of zone T in sump 722.

The regenerated scrubbing solution at a temperature above its atmospheric boiling temperature is withdrawn from zone T by line 748, and, after passing through pressure letdown valve 749, is introduced into flash tank 750 where pure steam flashes off from the solution by the reduction to approximately atmospheric pressure. The evolved steam is fed by line 751 into the bottom of lower pressure regeneration zone U where it provides a substantial proportion of the stripping steam requirements in zone U.

The regenerated solution, cooled through the endothermic steam flashing, collects in sump 752, is withdrawn by line 753, and recirculated by recirculation pump 754, line 755, proportional flow valve 756, and lines 704 and 707 to the top portions of higher temperature absorption zones R and S. The required ratio of flow of regenerated solution into zones R and S may be controlled by proper adjustment of valve 756.

It will be noted in FIG. 7 that the absorption zones become successively smaller in diameter from the bottom to the top of the column. The successive reduction in the diameter of the top sections becomes possible in cases where the acid gas concentration is quite high since, in such cases, by the time the gas mixture reaches the upper zones there will have been a substantial reduction in the volumetric flow of the gas stream because of the absorption of a major proportion of the acid gases in the lower absorption zones. This permits smaller tower diameters with concomitant reduction in tower cost.

EXAMPLE 5

The operation of the system of FIG. 7 will now be illustrated by the following typical example. A stream of natural gas at 1,000 pounds per square inch total pressure and a temperature of 20° C. with a flow rate of 100 million cubic feet per day containing 50% by volume of $CO_2$ ($CO_2$ partial pressure of 500 pounds per square inch) is introduced into the bottom of absorber tower 700 by line 710. Regenerated scrubbing solution is introduced into zone Q by line 701 at a temperature of 106° C. and at a flow rate of 172,000 gallons per hour. The gas mixture, after contacting scrubbing solution in packed section Q', leaves absorption zone Q by chimney 711 at a temperature of about 106° C., saturated with water vapor, and containing 32.6% $CO_2$ corresponding to a $CO_2$ partial pressure of 326 pounds per square inch. Scrubbing solution in zone Q is cooled as it heats and saturates the gas stream in zone Q, but is heated by the heat of absorption. The heating and cooling effects in zone Q substantially cancel each other, and the solution leaves at the bottom of zone Q by line 703 at a temperature of 107° C.

The gas stream passes successively through higher temperature absorption zones R and S which are supplied with regenerated scrubbing solution by lines 707 and 704 at a temperature of 107° C. and at a flow rate into each zone of 172,000 gallons per hour. The gas entering zone S contains 16% $CO_2$ corresponding to a $CO_2$ partial pressure of 160 pounds per square inch. Since the gas stream enters zone R at essentially the same temperature as the solution introduced into zones R and S, no heat is transferred between the gas stream and the solutions in zones R and S. However, as equal amounts of $CO_2$ are absorbed in each of zones R and S, the heat of absorption causes the solution leaving each of these zones by lines 706 and 709, respectively, to be heated to a temperature of 117.5° C. The purified gas stream leaves the top of the tower by line 715 at a temperature of 107° C. saturated with water vapor and having a residual $CO_2$ concentration of 1% by volume.

The spent solution leaving the bottom of lower temperature absorption zone Q by line 703 at a flow rate of 172,000 gallons per hour is fed into the top of lower temperature regeneration zone U maintained at atmospheric pressure. After regeneration in zone U by contact with stripping steam in packed section U', regenerated solution is withdrawn from sump 728 at the bottom of zone U and recycled by line 743 and recycle pump 744 to the top of absorption zone Q.

The two streams of spent solution from absorption zones R and S are combined in line 745 and, after passing through pressure letdown valve 746, flow into the top of regeneration zone T at a temperature of 117.5° C. and at a flow rate of 344,000 gallons per hour. Zone T is maintained at a pressure of 10 p.s.i.g. above packing T' and at a pressure of 12 p.s.i.g. at the bottom of packing T'. After regeneration in zone T by contact with stripping steam in packed section T', the regenerated solution leaves the bottom of zone T by line 748 at a temperature of 118° C. After passing through pressure letdown valve 749, the solution is conducted to flash tank 750 operated at approximately atmospheric pressure. Steam flashes off from the solution at the rate of 58,000 pounds per hour and is fed by line 751 to regeneration zone U to serve as stripping steam. Solution collecting in sump 752 at the bottom of tank 750 is cooled to 107° C. and is then conducted by line 753, recycle pump 754, line 755, valve 756, and lines 704 and 707 to absorption zones R and S.

In Example 5 above, the amount of external steam normally required in the system, as measured by the total amount of steam normally generated in reboilers 721 and 727, is reduced by approximately 28%.

As in previous examples, this reduction in steam requirements correspondingly reduces the size of the reboilers 721 and 727, and correspondingly reduces the size of overhead condensers 734 and 738. Substantial reduction in the amount of packing in packed section T' is also achieved.

In some cases, it may be advantageous to provide for cocurrent flow of the gas and scrubbing solution in the first absorption zone to be contacted by the gas mixture. The higher the initial partial pressure of acid gas, the more advantageous such an arrangement becomes.

Reference is now made to FIG. 8 showing a multi-zone absorber adapted to treat a cool gas stream to remove and gas therefrom (regeneration column not shown) with the first zone arranged for occurrent flow of the gas stream and the scrubbing solution. The reference numeral 800 refers generally to an absorber tower containing a lower temperature absorption zone generally designated by the reference letter V having a packed section V', and two higher temperature absorption zones designated by the letters W and X, and containing packed sections W' and X', respectively. Scrubbing solution supplied to the lower temperature absorption zone V by line 801, which flows down over packed section V', collects at the bottom of zone V in sump 802 and is withdrawn for regeneration by line 803. High temperature zones X and W are supplied with regenerated scrubbing solution by lines 804 and 805, respectively, which in turn are supplied by line 806 delivering regenerated scrubbing solution to flow control valve 807 which splits the flow between lines 804 and 805. Spent scrubbing solution is withdrawn from sump 808 at the bottom of zone W by line 809 for regeneration in the higher temperature regeneration zone (not shown). Absorption zones V and W are separated from one another by a plate 808A.

Spent scrubbing solution collects in the bottom of zone X on collecting plate 810 and is withdrawn by line 811 for regeneration in the higher temperature regeneration zone.

A cool feed gas, e.g. a stream of natural gas such as that treated in Example 5, at a total pressure of e.g. 1,000 pounds per square inch and containing e.g. 50% $CO_2$, is introduced into the top of zone V by line 812. The gas mixture flows downwardly cocurrent with the stream of scrubbing solution introduced by line 801 over packed section V' leaving the bottom of zone V, with a portion of its acid gas removed, by line 813. The gas mixture in line 813 then flows into the bottom of absorption zone W, flows upwardly in countercurrent contact with scrubbing solution in packed section W' where further quantities of acid gas are absorbed. It then flows upwardly through chimney 814 in collection plate 810. Deflector cap 815 is provided to prevent solution from flowing downwardly through zone X from entering zone W. The gas mixture then passes upwardly in countercurrent contact with scrubbing solution in packed section X' where the bulk of the remainder of the acid gas is absorbed, and then leaves the absorption tower by line 816, flows through condenser 817 and leaves the system by line 818, aqueous condensate being refluxed to the absorber by line 819.

The principal advantage of providing the cocurrent gas and solution flow in the first section of the absorber is a sharp increase in the capacity of this zone to handle high gas and liquid flows without flooding. In countercurrent gas-liquid flow, where the gas passes upwardly countercurrent to the liquid, the gas throughput is limited by the so-called "flooding limit" at which the frictional forces exerted by the gas stream on the downwardly flowing liquid become so great as to impede the normal downward flow of liquid, resulting in excessive liquid hold-up, excessive pressure drop, and excessive entrainment of liquid in the gas stream. In cocurrent gas and liquid flow, on the other hand, there is no flooding limit, and much higher gas and liquid rates can be employed.

Where the initial partial pressure of acid gas is quite high, e.g. 100 pounds per square inch or higher, cocurrent flow is advantageously employed in the first absorption zone in order to minimize the diameter of the absorption tower in that zone. The first absorption zone is particularly prone to flooding where countercurrent liquid contact is employed because both the gas velocity and the density of the gas mixture in many cases will be at a maximum. For example, if the feed gas is a mixture of methane and $CO_2$ containing 50% $CO_2$ and flowing at a rate of one million normal cubic feet per hour, the gas flow entering the first zone will be one million normal cubic feet per hour of a gas having a density of 5.57 pounds per normal cubic foot, whereas in the second zone the gas mixture, now containing e.g. only 30% $CO_2$, will have a flow rate of 719,000 normal cubic feet per hour and a density of 3.25 pounds per normal cubic foot. If the $CO_2$ content is reduced to 15% entering the third absorption zone, the gas mixture will have a flow rate of 588,000 normal cubic feet per hour, and a density of 2.58 pounds per normal cubic foot. Despite the high gas flow and gas density in the first zone, by the use of cocurrent gas and liquid flow, a smaller absorber diameter can be employed in the first absorber section than would otherwise be permissible. Thus, as shown in FIG. 8, although both the gas flow and gas density are substantially higher in absorber section V, the same tower diameter is employed as in section W.

While it is possible to employ cocurrent gas and liquid flow in the first section of the absorber in cases where the partial pressure of acid gas in the raw feed gas is high, countercurrent flow will generally be desirable in the upper sections of the absorber where the partial pressure of acid gas is progressively decreasing.

Reference is now made to FIG. 10 which shows an embodiment similar to that of FIGS. 2 and 7 adapted for the treatment of a cool feed gas, but which is suitable for reducing the residual acid gas content to low levels. In some cases, for example, it may be desired to reduce the residual concentration of $H_2S$ down to very low levels such as 1 to 5 parts per million, and in such cases the embodiment illustrated in FIG. 10 may be advantageously employed.

In FIG. 10, the reference numeral 1000 refers generally to the absorption tower. The first zone to be contacted by the gas is zone AA provided with a section AA' containing packing, plates, or other means for providing intimate gas-liquid contact. Above lower temperature absorption zone AA, there is arranged higher temperature absorption zone BB provided with packed section BB'. Above higher temperature absorption zone BB, there is a third separate absorption zone CC having a packed section CC' and provided with a stream of cooled, more thoroughly regenerated solution to reduce the acid gas content down to low residual levels. Because the solution fed to zone CC is cooled, and also because the amount of acid gas absorbed in zone CC will generally be relatively small, zone CC will operate at a lower temperature than zone BB.

Zone AA is supplied with regenerated scrubbing solution by line 1001. Spent solution is withdrawn from sump 1002 at the bottom of zone AA by line 1003.

Zone BB is supplied with regenerated scrubbing solution by line 1004. Spent scrubbing solution collects at the bottom of zone BB on collecting plate 1005, and is withdrawn by line 1006.

Zone CC is supplied with regenerated scrubbing solution by line 1007. Spent scrubbing solution collects at the bottom of zone CC on collecting plate 1008 and is withdrawn by line 1009.

The cool feed gas containing $CO_2$ and/or $H_2S$ is introduced into the bottom of the absorber tower by line 1011, and flows upwardly in successive contact with scrubbing solution in absorption zones AA, BB, and CC. The gas travels from zone AA to zone BB through chimney 1012 provided with a deflector cap 1013 to prevent solution flowing downwardly from zone BB to zone AA. Similarly, the gas stream travels from zone BB to zone CC through chimney 1014 provided with a deflector cap 1015 to prevent solution from flowing from zone CC to zone BB. The purified gas stream leaves the top of the absorber by line 1016, passes through condenser 1017, and leaves the system by line 1019. Condensate from the condenser refluxes into the top of the absorber through line 1018.

The regeneration of the solution occurs in regeneration tower designated generally by the reference numeral 1020, consisting of a higher temperature regeneration zone made up of sub-zone FF supplied with a packed section FF', and a sub-zone EE provided with a packed section EE'. The lower temperature regeneration zone DD is arranged above the higher pressure regeneration zone and is provided with a packed section DD'. Dome 1021 separates lower pressure regeneration zone DD from higher pressure regeneration sub-zones EE and FF.

The higher pressure regeneration zone is applied with stripping steam by reboiler 1027 provided with a steam coil 1027a. Solution from sump 1028 at the bottom of the higher pressure regeneration zone circulates through reboiler 1027 through lines 1029 and 1030. Steam generated in reboiler 1027 is introduced into the bottom of the higher pressure regeneration zone by line 1031.

A portion of the stripping steam for the lower pressure regeneration zone DD is generated by reboiler 1022 provided with a steam coil 1022a. Solution from sump 1023 at the bottom of zone DD is circulated through the reboiler by lines 1024 and 1025. Steam generated in reboiler 1022 is introduced into the bottom of zone DD by line 1026.

The mixture of steam and acid gas collecting at the top of zone DD is removed by line 1032, and passed through condenser 1033. Acid gas leaves the condenser 1035 while the condensate is refluxed to zone DD by line 1034.

The mixture of steam and acid gas collecting at the top of the higher pressure regeneration zone is removed by line 1036, and passed through condenser 1037. The acid gas leaves the condenser by line 1042 while condensate leaves by line 1038. The condensate may be divided into two streams by flow control valve 1039, one portion being delivered by line 1041 to the top of packed section EE' while another portion is delivered to the top of packed section FF' by line 1040.

Lower pressure regeneration zone DD serves to regenerate scrubbing solution from lower temperature absorption zone AA. Spent solution leaving zone AA by line 1003, after passing through pressure letdown valve 1043, is conducted by line 1044 to the top of zone DD. The solution flows down over packed section DD' where it is exposed to stripping steam introduced at the bottom of zone DD by lines 1026 and 1064. Regenerated scrubbing solution collecting in sump 1023 is recirculated by line 1045, recycle pump 1046, and line 1001 to the top of lower temperature absorption zone AA.

Higher pressure regeneration sub-zone EE serves to regenerate solution from the higher temperature absorption zone BB. Spent scrubbing solution leaving zone BB by line 1006, after passing through pressure letdown valve 1047, is conducted by line 1048 to the top of packed section EE'. The solution flows down through packed section EE' in contact with stripping steam generated at the bottom of the higher pressure regeneration zone by reboiler 1027. The regenerated solution collects on collecting plate 1049 at the bottom of sub-zone EE, and is withdrawn by line 1051 at a temperature above its atmospheric boiling temperature. After passing through pressure letdown valve 1052, the solution is then conducted to flashing tank 1053 where the pressure is reduced to approximately atmospheric (slightly above that prevailing at the bottom of regeneration zone DD). The steam evolved upon reduction of the pressure is conducted by line 1055 and line 1064 to the bottom of lower pressure regeneration zone DD to serve as stripping steam.

The cooled solution collecting in sump 1054 at the bottom of flash tank 1053, at approximately the atmospheric boiling temperature of the regenerated solution is conducted by line 1056, recycle pump 1057, and line 1004 to the top of higher temperature absorption zone BB.

Higher pressure regeneration sub-zone FF serves to regenerate scrubbing solution from absorption zone CC. The spent solution from zone CC leaving by line 1009, after passing through pressure letdown valve 1058, is conducted by line 1059 to the top of packed section FF'. The solution flows downwardly over the packing in contact with stripping steam generated by reboiler 1027. The regenerated solution collects at the bottom of sub-zone FF in sump 1028 at a temperature above its atmospheric boiling temperature, and is conducted by line 1060 through pressure letdown valve 1061 to flash tank 1062 where the pressure is reduced to approximately atmospheric pressure. The steam evolved upon pressure reduction is conducted by line 1063 and line 1064 to the bottom of regeneration zone DD to serve as effective stripping steam. The regenerated solution, now at approximately its atmospheric boiling temperature, collects at the bottom of tank 1062 in sump 1065, and is conducted by line 1066, recycle pump 1067, line 1068, cooler 1069, and line 1007 to the top of absorption zone CC.

EXAMPLE 6

The operation of the system of FIG. 10 will now be illustrated by the following typical example. A stream of natural gas at 1,200 lbs./in.$^2$ total pressure at a temperature of 20° C. and containing 30% by volume of $CO_2$ and 10% by volume of $H_2S$ (total acid gas partial pressure of 480 lbs./in.$^2$), is introduced into the bottom of the absorber tower by line 1011. The cool gas is heated and saturated in zone AA by contact with the hot, regenerated aqueous alkaline scrubbing solution introduced by line 1001 at its atmospheric boiling temperature. The cooling effect of the gas stream is substantially cancelled by the heat of absorption of acid gas in zone AA, and the solution leaving by line 1003 is at approximately the same temperature as that entering by line 1001.

In higher temperature absorption zone BB, the hot, saturated gas encounters regenerated scrubbing solution introduced at approximately atmospheric boiling temperature by line 1004. The solution is heated above its atmospheric boiling temperature by the heat of absorption of the acid gas in zone BB, while the gas stream leaves the top of zone BB at approximately the inlet temperature of the solution entering by line 1004.

The scrubbing solution employed in zones AA and BB is an aqueous 30% by weight potassium carbonate solution containing 4% of diethanolamine. This solution is fed to zones AA and BB through lines 1001 and 1004, respectively, at a temperature of about 109° C.

In absorption zones AA and BB, the bulk of the acid gas is removed. The gas stream entering zone CC through chimney 1014 contains 2% $CO_2$ and 0.1% $H_2S$. In zone CC, the gas stream containing these relatively small residual amounts of acid gas encounters a cooled, more thoroughly regenerated solution introduced by line 1007 whereby the acid content is further reduced to a final residual level of 0.5% $CO_2$ and 2 to 3 parts per million of $H_2S$.

The solution employed in zone CC is an aqueous solution containing 10% by weight of potassium carbonate and 10% by weight of diethanolamine which has been cooled to a temperature of 50° C. in cooler 1069.

Of the total solution flowing in the system of FIG. 10, 40% flows through absorption zone AA and its corresponding regeneration zone DD; 45% flows through absorption zone BB and its corresponding regeneration zone EE, while 15% of the total solution circulating flows through zone CC and its corresponding regeneration zone FF.

Lower pressure regeneration zone DD is operated at atmospheric pressure while the higher pressure regeneration zone comprising sub-zones EE and FF is operated at 12 lbs./in.$^2$ gage.

It will be noted that stripping steam generated at the bottom of the higher pressure regeneration zone first passes through packed section FF′ in contact with solution from absorption zone CC, and then passed upwardly through the chimney provided in plate 1049 equipped with a deflector cap 1050 where it contacts scrubbing solution from absorption zone BB flowing downwardly through packed section EE′. With this arrangement, all of the stripping steam in the higher pressure regeneration zone is first employed to strip the solution from absorption zone CC comprising 15% of the total solution flow in the system. This results in the thorough regeneration of the scrubbing solution in sub-zone FF such that the regenerated solution collecting in sump 1028 is regenerated to a considerably higher degree than the solution in sub-zone EE which comprises 45% of the total solution flow. In other words, the solution flowing through sub-zone FF is treated with three times as much steam per volume of solution as the solution flowing in sub-zone EE. When this thoroughly regenerated solution from zone FF is cooled in cooler 1069, the already low acid gas back pressure from the solution is still further reduced, permitting the reduction of the residual acid gas in the gas stream leaving the absorber to low levels.

In the system of FIG. 10, it will be noted that zone CC is essentialy a clean-up zone through which a minor proportion of the solution is circulated, and in which only a small amount of the total acid gas is absorbed, and that this zone is on a completely separate circuit both in the absorption and regeneration stages. This is in contrast, for example, to the system of FIG. 4 wherein the cooled stream introduced into the top of the absorber by line 404 is not on a separate circuit, but rather mixes with the stream introduced at an intermediate point by line 405.

The operation of absorber zone CC as a completely separate circuit permits the use in absorber zone CC of a solution having a different composition from that employed in the other absorption zones. Thus, in the example given above, the solution employed in zone CC is a 10% by weight potassium carbonate solution containing 10% by weight of diethanolamine, such a mixture being particularly suitable for operation at the lower temperatures that are employed in zone CC.

In the operation of the system of FIG. 10, as in the other systems previously described, the flashing steam generated in flash tanks 1053 and 1062 replaces a substantial proportion of the steam otherwise required for the operation of the system, and consequently substantially increases the thermal efficiency of the process. Savings in the size of the overhead condensers and of the reboilers and in the amount of packing required are also achieved as in previous systems.

It is to be understood that other embodiments of the invention in addition to those specifically described and illustrated above are inculded within the scope of the invention, and that the invention is not limited to the specific embodiments described. For example, instead of, or in addition to, the use of a cooler, such as a water or air cooler, to cool a portion of the solution in those embodiments where this is done, it may be desirable in some cases to employ a "flash cooling" technique. The use of this technique to cool the solution and generate useful stripping steam is illustrated in FIG. 8 of U.S. Patent No. 2,886,405 to H. E. Benson et al. Thus, for example, the solution cooler 349 in FIG. 3, the solution cooler 451 in FIG. 4 and FIG. 5, and solution cooler 610 in FIG. 6, and the solution cooler 1069 in FIG. 10 may be replaced by, or supplemented by the use of "flash cooling" as described with reference to FIG. 8 of U.S. Patent No. 2,886,405.

In FIG. 4, for example, the solution leaving flash tank 445 by line 448 at approximately its atmospheric boiling temperature may be conducted to a second flash tank connected to a steam ejector which reduces the pressure in the tank below atmospheric pressure, causing the evolution of steam and cooling of the solution. The solution, cooled e.g. to a temperature of 95° C. by this technique, may then be recirculated through cooler 451 where the solution temperature is further reduced, and then introduced into the top of the absorber column by line 404.

The steam evolved by the second reduction in pressure is drawn into the steam ejector and compressed by mixing with the high pressure motive steam employed to operate the ejector. The mixture of flash steam and motive steam is introduced into the bottom of the lower pressure regeneration zone P to serve as additional stripping steam.

It is also to be understood that the invention is not limited to any particular arrangement of equipment. Thus, for example, it is not necessary, although often desirable, to arrange the individual absorption and regeneration zones super-imposed one above the other, as shown in the schematic flow sheets. If desired, some or all of the absorption or regeneration zones may be arranged in side-by-side relationship on separate foundations, although, as stated above, the superimposed relationship of the separate zones as illustrated will generally be found most convenient and economical.

Finally, it will be recognized that the illustrative flow diagrams do not include all the necessary auxiliaries or instrumentation required for the practical operation of a commercial plant. Thus, for example, it will, of course, be necessary to provide separator, or knock-out, drums downstream from the reboilers 35 and 39 in FIG. 1 in order to separate the condensed water vapor that will accumulate in these lines as the saturated feed gas entering by line 43 is cooled in its passage through reboilers 35 and 39. Similar knock-out drums will, of course, also be employed in connection with the reboilers shown in FIGS. 3, 4, 4a, 5 and 6. It is intended, of course, that such auxiliaries and other items required by sound engineering practice, but not specifically shown, will be employed in the practical operation of the systems illustrated.

I claim:

1. A method for removing acid gases of the group consisting of $CO_2$ and $H_2S$ from gas mixtures wherein the partial pressure of such acid gas in said mixture is at least about 25 pounds per square inch, said method comprising the steps of establishing at least two separate superatmospheric pressure absorption zones maintained at a pressure of at least 100 pounds per square inch gage and supplied with separate streams of an aqueous alkaline scrubbing solution which is regenerable by steam-stripping, said streams being separately withdrawn from each absorption zone, establishing at least two separate regeneration zones wherein said separate streams of solution are steam-stripped to desorb said acid gas therefrom at pressures substantially lower than the pressure in said absorption zones, passing said gas mixture in series through said separate absorption zones in succesive contact with said separate streams of scrubbing solution to absorb said acid gas in said solution, maintaining one of said absorption zones as a higher temperature zone with a solution outlet temperature above the atmospheric boiling temperature of the regenerated solution, maintaining another of said absorption zones as a lower temperature zone with a solution outlet temperature lower than that of said higher temperature absorption zone, maintaining one of said regeneration zones as a higher temperature zone, operating at superatmospheric pressure and supplied with hot solution from said higher temperature absorption zone, maintaining another of said regeneration zones as a lower pressure, lower temperature zone supplied with solution from said lower temperature absorption zone, reducing the pressure on the regenerated solution leaving said higher pressure regeneration zone, thereby flashing off steam and cooling said solution, feeding said flashed steam into said lower pressure regeneration zone as stripping steam, and returning the regenerated streams of solution from said higher temperature and lower temperature regeneration zones to said absorption zones.

2. A method in accordance with claim 1 in which the partial pressure of acid gas in said gas mixture is at least about 40 pounds per square inch.

3. A method in accordance with claim 1 in which the acid gas in said gas mixture is at least predominantly $CO_2$.

4. A method in accordance with claim 1 in which said scrubbing solution comprises an aqueous solution of potassium carbonate.

5. A method in accordance with claim 1 in which said scrubbing solution is an aqueous solution of potassium carbonate containing an additive of the group consisting of ethanolamines, alkali metal borates, $As_2O_3$, and amino acids.

6. A method in accordance with claim 1 in which the regenerated scrubbing solution enters the higher temperature absorption zone at approximately its atmospheric boiling temperature.

7. A method in accordance with claim 1 in which the pressure in said higher pressure regeneration zone is in the range of from 5 to 35 pounds per square inch gage.

8. A method in accordance with claim 1 in which the pressure in said higher pressure regeneration zone is in the range of from 10 to 30 pounds per square inch gage.

9. A method for removing acid gases of the group consisting of $CO_2$ and $H_2S$ from hot, steam-containing gas mixtures wherein the partial pressure of such acid gas in said mixture is at least about 25 pounds per square inch, said method comprising the steps of establishing at least two separate superatmospheric pressure absorption zones maintained at a pressure of at least 100 pounds per square inch gage and supplied with separate streams of an aqueous alkaline scrubbing solution which is regenerable by steam-stripping, said streams being separately withdrawn from each absorption zone, establishing at least two separate regeneration zones wherein said separate streams of solution are steam-stripped to desorb said acid gas therefrom at pressures substantially lower than the pressure in said absorption zones, passing said gas mixture in series through said absorption zones in successive contact with said separate streams of scrubbing solution to absorb said acid gas in said solution, supplying the first of said absorption zones with said hot, steam-containing gas mixture and maintaining said first zone as a higher temperature zone in which said scrubbing solution is heated above the atmospheric boiling temperature of the regenerated solution by direct contact with said hot, substantially saturated gas mixture and by the heat of absorption of said acid gas, maintaining another of said absorption zones as a lower temperature zone with a solution outlet temperature lower than that of said higher temperature absorption zone, maintaining one of said regeneration zones as a higher temperature zone operating at superatmospheric pressure and supplied with hot solution from said higher temperature absorption zone, maintaining another of said regeneration zones as a lower pressure, lower temperature zone supplied with solution from said lower temperature absorption zone, reducing the pressure on the regenerated solution leaving said higher pressure regeneration zone, thereby flashing off steam and cooling said solution, feeding said flashed steam into said lower pressure regeneration zone as stripping steam and returning the regenerated streams of solution from said higher temperature and lower temperature regeneration zones to said absorption zones.

10. A method in accordance with claim 9 in which the partial pressure of acid gas in said gas mixture is at least about 40 pounds per square inch.

11. A method in accordance with claim 9 in which the acid gas in said gas mixture is at least predominantly $CO_2$.

12. A method in accordance with claim 9 in which said scrubbing solution comprises an aqueous solution of potassium carbonate.

13. A method in accordance with claim 9 in which said scrubbing solution is an aqueous solution of potassium carbonate containing an additive of the group consisting of ethanolamines, alkali metal borates, $As_2O_3$, and amino acids.

14. A method in accordance with claim 9 in which the regenerated solution enters the higher temperature absorption zone at approximately its atmospheric boiling temperature.

15. A method in accordance with claim 9 in which the pressure in said higher pressure regeneration zone is in the range of from 5 to 35 pounds per square inch gage.

16. A method in accordance with claim 9 in which the pressure in said higher pressure regeneration zone is in the range of from 10 to 30 pounds per square inch gage.

17. A method in accordance with claim 9 in which at least a portion of the regenerated scrubbing solution fed to said lower temperature absorption zone is cooled before entering said zone.

18. A method in accordance with claim 9 in which a portion of the regenerated solution supplied to said lower temperature absorption zone is cooled and fed to the top of said zone, while another portion of said solution is fed to said zone at a lower level at a higher temperature.

19. A method in accordance with claim 9 in which a portion of the regenerated solution supplied to said lower temperature absorption zone is cooled to a temperature of 50° C. to 90° C. and is then fed to the top of said zone, while another portion of said solution is fed to said zone at a lower level at a higher temperature.

20. A method in accordance with claim 9 in which a portion of the regenerated solution supplied to said lower temperature absorption zone is subjected to more thorough regeneration, cooled, and is fed to the top of said zone, while another portion of said solution is subjected to less thorough regeneration and is fed to said zone at a lower level at a higher temperature.

21. A method in accordance with claim 9 in which a portion of the regenerated solution supplied to said lower temperature absorption zone is subjected to more thorough regeneration, cooled to a temperature of 50° C. to 90° C., and is then fed to the top of said zone while another portion of said solution is subjected to less thorough regeneration and is fed to said zone at a lower level at a higher temperature.

22. A method in accordance with claim 9 in which a portion of said scrubbing solution is subjected to more thorough regeneration in said higher pressure regeneration zone, subjected to pressure reduction producing flash steam and cooling of said solution, after which at least a part of said more thoroughly regenerated solution is further cooled and fed to the top of said lower temperature absorption zone, while another portion of said scrubbing solution is subjected to less thorough regeneration and fed to said lower temperature absorption zone at a lower level at a higher temperature.

23. A method for removing acid gas of the group consisting of $CO_2$ and $H_2S$ from cool gas mixtures wherein the partial pressure of such acid gas in said mixture is at least about 25 pounds per square inch, said method comprising the steps of establishing at least two separate superatmospheric pressure absorption zones maintained at a pressure of at least 100 pounds per square inch gage and supplied with separate streams of an aqueous alkaline scrubbing solution which is regenerable by steam-stripping, said streams being separately withdrawn from each absorption zone, establishing at least two separate regeneration zones wherein said separate streams of solution are steam-stripped to desorb said acid gas therefrom at pressures substantially lower than the pressure in said absorption zones, passing said gas mixture in series through said separate absorption zones in successive contact with said separate streams of scrubbing solution to absorb said acid gas in said solution, supplying the first of said absorption zones with said cool gas mixture and maintaining said first zone as a lower temperature zone in which heat is transferred from said solution to said gas mixture thereby effecting heating and saturation of said gas mixture, maintaining another of said absorption zones as a higher temperature absorption zone supplied with the heated, saturated gas mixture from said first zone and having a solution outlet temperature above the atmospheric boiling temperature of the regenerated solution, maintaining one of said regeneration zones as a higher-temperature zone operating at superatmospheric pressure and supplied with hot solution from said higher-temperature absorption zone, maintaining another of said regeneration zones as a lower-pressure, lower-temperature regeneration zone supplied with solution from said lower-temperature absorption zone, reducing the pressure on the regenerated solution leaving said higher-pressure regeneration zone, thereby flashing off steam and cooling said solution, feeding said flashed steam into said lower-pressure regeneration zone as stripping steam and returning the regenerated streams of solution from said higher-temperature and lower-temperature regeneration zones to said absorption zones.

24. A method in accordance with claim 23 in which the partial pressure of acid gas in said gas mixture is at least about 40 pounds per square inch.

25. A method in accordance with claim 23 in which the acid gas in said gas mixture is at least predominantly $CO_2$.

26. A method in accordance with claim 23 in which said scrubbing solution comprises an aqueous solution of potassium carbonate.

27. A method in accordance with claim 23 in which said scrubbing solution is an aqueous solution of potassium carbonate containing an additive of the group consisting of ethanolamines, alkali metal borates, $As_2O_3$, and amino acids.

28. A method in accordance with claim 23 in which the regenerated scrubbing solution enters the higher temperature absorption zone at approximately its atmospheric boiling temperature.

29. A method in accordance with claim 23 in which the pressure in said higher pressure regeneration zone is in the range of from 5 to 35 pounds per square inch gage.

30. A method in accordance with claim 23 in which the pressure in said higher pressure regeneration zone is in the range of from 10 to 30 pounds per square inch gage.

References Cited

UNITED STATES PATENTS

| | | | |
|---|---|---|---|
| 1,971,798 | 8/1934 | Shoeld | 23—3 |
| 2,886,405 | 5/1959 | Benson et al. | 23—3 |
| 3,101,996 | 8/1963 | Bresler et al. | 23—2 |
| 3,144,301 | 8/1964 | Mayland | 23—2 |

FOREIGN PATENTS

| | | | |
|---|---|---|---|
| 849,150 | 9/1960 | Great Britain | 23—2 |

EARL C. THOMAS, Primary Examiner